US012680801B2

(12) United States Patent
Wabnegger et al.

(10) Patent No.: US 12,680,801 B2
(45) Date of Patent: *Jul. 14, 2026

(54) IMPLOSION SHIELD APPARATUS AND METHOD

(71) Applicant: Quanta Associates, L.P., Houston, TX (US)

(72) Inventors: David Karl Wabnegger, La Grange, TX (US); Daniel Neil O'Connell, Oliver (CA); Mark Douglas Ferrari, Houston, TX (US); Benjamin James Harvey, Cape Coral, FL (US)

(73) Assignee: Quanta Associates, L.P., Houston, TX (US)

( * ) Notice: Subject to any disclaimer, the term of this patent is extended or adjusted under 35 U.S.C. 154(b) by 62 days.

This patent is subject to a terminal disclaimer.

(21) Appl. No.: 18/812,709

(22) Filed: Aug. 22, 2024

(65) Prior Publication Data

US 2026/0071861 A1 Mar. 12, 2026

Related U.S. Application Data

(63) Continuation-in-part of application No. 18/331,458, filed on Jun. 8, 2023, now Pat. No. 12,092,445, which
(Continued)

(30) Foreign Application Priority Data

Dec. 20, 2019 (CA) ..................................... 3065707

(51) Int. Cl.
*F42D 5/05* (2006.01)
*D03D 1/00* (2006.01)
(Continued)

(52) U.S. Cl.
CPC ............. *F42D 5/05* (2013.01); *D03D 1/0052* (2013.01); *D04B 21/18* (2013.01); *F41H 5/0471* (2013.01);
(Continued)

(58) Field of Classification Search
CPC .......... F41H 5/0485; F42D 5/045; F42D 5/05; F42D 5/055
(Continued)

(56) References Cited

U.S. PATENT DOCUMENTS

| | | | | |
|---|---|---|---|---|
| 3,491,847 A | * | 1/1970 | Abbott | ................... B65D 85/68 |
| | | | | 102/303 |
| 3,648,613 A | * | 3/1972 | Cunn | ........................ F42D 5/05 |
| | | | | 102/303 |

(Continued)

*Primary Examiner* — Bret Hayes
(74) *Attorney, Agent, or Firm* — Oathout Law Firm; Antony C. Edwards; Laura Tu

(57) ABSTRACT

An implosion shield of ballistic fabric is formed by a selected number of layers of ballistic fabric draped, enveloped or coiled around an implosion sleeve or dead-end and secured with fasteners through holes formed around the perimeter of the ballistic fabric. The implosion shield is installed around the implosion sleeve or dead-end by draping over or wrapping or enveloping and fastening the implosion shield around the implosion sleeve or dead-end so as to attenuate shock, pressure and sound waves from the detonation and so as to direct pressurized gas from the detonation along and parallel to the powerline or down and away from the powerline to keep it away from linemen in a bucket or on the ground.

20 Claims, 23 Drawing Sheets

Related U.S. Application Data is a continuation of application No. 17/127,511, filed on Dec. 18, 2020, now Pat. No. 11,713,954.

(60) Provisional application No. 62/951,874, filed on Dec. 20, 2019.

(51) Int. Cl.

| | | |
|---|---|---|
| *D04B 21/18* | (2006.01) | |
| *F41H 5/04* | (2006.01) | |
| *H02G 1/02* | (2006.01) | |
| *H02G 1/14* | (2006.01) | |

(52) U.S. Cl.

CPC ............. *F41H 5/0478* (2013.01); *H02G 1/02* (2013.01); *H02G 1/14* (2013.01); *D10B 2401/061* (2013.01); *D10B 2505/00* (2013.01)

(58) Field of Classification Search

USPC ................ 102/303, 305; 86/50; 89/916, 922

See application file for complete search history.

(56) References Cited

U.S. PATENT DOCUMENTS

| | | | |
|---|---|---|---|
| 3,814,016 A | | 6/1974 | Leach et al. |
| 4,057,359 A | * | 11/1977 | Grooman .............. F01D 21/045 |
| | | | 428/36.1 |
| 5,153,383 A | * | 10/1992 | Whited .................. H01B 17/00 |
| | | | 174/138 F |
| 6,439,120 B1 | * | 8/2002 | Bureaux ................. F42D 5/045 |
| | | | 102/303 |
| 6,991,124 B1 | | 1/2006 | Palley et al. |
| 8,573,125 B1 | | 11/2013 | Rossow et al. |
| 8,653,366 B2 | * | 2/2014 | Quesnel ................. H02G 7/056 |
| | | | 174/74 R |
| 11,713,954 B2 | * | 8/2023 | Wabnegger ............... F42D 5/05 |
| | | | 102/303 |
| 12,092,445 B2 | * | 9/2024 | Wabnegger .......... D03D 1/0052 |
| 2001/0049245 A1 | * | 12/2001 | Soar ..................... D03D 15/283 |
| | | | 428/911 |
| 2009/0095147 A1 | | 4/2009 | Tunis et al. |
| 2013/0098233 A1 | * | 4/2013 | Peters ...................... F41H 5/08 |
| | | | 89/36.02 |
| 2016/0040962 A1 | * | 2/2016 | Rossow ................... B32B 5/06 |
| | | | 89/36.02 |

* cited by examiner

IMPLOSION SHIELD APPARATUS AND METHOD

TECHNICAL FIELD

This disclosure relates to an apparatus for shielding an implosion device used on a power line, a method of installing an apparatus for shielding an implosion device on a power line, and a method and apparatus for protecting adjacent apparatus such as insulators, tools, hoists, grips and slings and for protecting fragile items such as windows at a distance.

BACKGROUND

In the process of electrically joining two free ends of separate electrical power line conductors to create a single, continuous electrically conductive joint, and a mechanical connection. Typically, a compression splice sleeve is used to join the two free ends and maintain electrical and mechanical integrity and requisite ampacity in the conductor. To achieve the requisite mechanical connection and to provide an electrically sufficient electrical connection, an implosion device may be used to form the joint and mechanical connection with the two free ends of the separate conductors. While implosion devices have typically been adequate in achieving the desired mechanical connection properties to safely join the two free ends of two conductors, while achieving the desired electrical connection of the two free ends, such implosion devices are not without limitations, and room for improvement exists. Also, to mechanically terminate a powerline conductor a compression deadend sleeve, bolted deadend connector or an implosion device may also be used. What is desired is an apparatus and method to reduce audible implosion noise, to attenuate or otherwise reduce the amplitude of shock and pressure waves emanating externally from detonation of the explosive used for the implosion, to contain or slow blast fragmentation debris while maintaining the desired mechanical and electrical connection of two free ends of two separate electrical conductors, and to protect adjacent tools, equipment, apparatus, hardware, structures or connected equipment.

One of the problems addressed in the present disclosure is how to minimize the external effects of the implosion detonation during the implosion splicing or terminating procedure. As described better below, the implosion splicing device, such as supplied for example by Burndy of Manchester, New Hampshire, USA under the trademark IMPLO, is an explosive device using a wrapping of detonation cord around a hollow aluminum tube which, in use, is installed so as to contain the ends of the two conductors to be joined. The implosion of the detonation cord wrapped around the aluminum tube fuses the aluminum tube with the ends of the conductors making a seamless splice having better mechanical and electrical properties than a mechanical or compression splice. The implosion splice device is a one-time use, after the implosion detonation. Applicant's postulate however that one or more embodiments of the flexible implosion shielding device described below, which is intended to attenuate externally propagating pressure, shock, and sound waves, and fragmentation resulting from the detonation of the device, will withstand the external effects of an implosion sufficiently that the device will withstand more than one implosion detonation when used temporarily when the conductors are implosion spliced or terminated while in an energized or non-energized state. Thus, the implosion shielding device described herein is not permanently installed on a power line conductor, implosion sleeve or termination, but rather is only used to splice or terminate power line conductor ends together during construction or maintenance, and to shield adjacent structure, equipment or rigging from effects of the implosion blast.

In the prior art, applicant is aware of published US patent application, publication number 20120129416, which published on May 24, 2012, in the application of Auxetic Technologies Ltd. for Auxetic Knitted Fabric, the relevancy of which is discussed below in relation to the present application. The Auxetic Knitted Fabric published patent application, incorporated herein by reference, discloses an auxetic knitted fabric comprising an auxetic component knitted from at least a first type of fiber, and a stabilizing component knitted from at least a second type of fiber, wherein the first and second fiber types have different mechanical properties.

BRIEF SUMMARY OF THE DISCLOSURE

The disclosure may include an implosion device such as an implosion splice sleeve or implosion dead-end sleeve and a protective implosion shield surrounding or shrouding the implosion device so as to attenuate an external shock wave, sound wave and fragmentation resulting from the detonation of the implosion device, and a protective implosion shield surrounding, shrouding or covering and protecting adjacent tools, equipment, apparatus, hardware, structures or connected equipment. In order to accomplish this, various embodiments are described below, such as an implosion protective shield that at least partially, and in some embodiments fully surrounds the implosion sleeve, or an implosion protective shield that is mounted on a frame that supports the implosion cover spaced apart from and over or around the implosion or an implosion protective shield that at least partially, and in some embodiments fully surrounds and protects adjacent tools, equipment, apparatus, hardware, structures or connected equipment, or an implosion protective shield that is mounted on a frame that supports the implosion cover.

The frame may for example suspend or support itself from the conductors to be joined or terminated. This may be a stable arrangement where the frame is at least partially above and partially below or around the conductors and implosion device. In order, to suspend the frame, at least a part of the frame, for example a spaced apart pair of support arms supporting the frame, may be mounted on the conductors, so as to extend approximately perpendicular to the implosion device. The implosion protective shield is intended provide a blast, shock wave and sound attenuating protective barrier. Advantageously the shield incorporates, in whole or in part, auxetic ballistic fabric for improved ballistic resistance and improved detonation shock and sound wave attenuation. Additionally, the use of auxetic ballistic fabric may provide at least some attenuation of electro-magnetic energy which may radiate from the detonation of the implosion device so as to reduce effects of the electro-magnetic energy on electronics within an effected distance of the electro-magnetic radiation.

The disclosure also includes a method of, once an implosion device is installed on a power line (e.g. two separate loose ends of different abutting conductors to be spliced or terminating a conductor end to hold tension), installing an implosion protective shield on or around the implosion device.

Various embodiments such as rolled, enveloped and tented implosion shields are described below and illustrated in the accompanying drawing figures.

In further embodiments, implosion protective shields may also be mounted on, so as to protect, adjacent tools, equipment, apparatus, hardware, structures or connected equipment which would be in proximity to the implosion splicing or terminating.

The claims at the end of this specification, which form a part of this specification, are directed to an implosion shield for mounting over an implosion splice sleeve or dead-end termination having at least horizontally exposed sides. The implosion shield includes at least one sheet of ballistic fabric. Hereinafter the at least one sheet of ballistic fabric may be referred for simplicity merely as a sheet of ballistic fabric.

The sheet of ballistic fabric is adapted to be mounted over, coiled around and fastened so as to surround at least the horizontally exposed sides of the implosion sleeve or dead-end during detonation of the implosion sleeve or dead-end. The coiling of the sheet of ballistic fabric allows the operator, typically a lineman, to select a plurality of layers of the sheet of ballistic fabric which surround the implosion sleeve or dead-end. The coiled layers of the sheet of ballistic fabric are fastened to secure the implosion shield by fastening one layer of the coiled sheet of ballistic fabric to at least an adjacent layer when mounted on the implosion sleeve or dead-end.

Advantageously the sheet of ballistic fabric includes holes through the sheet of ballistic fabric, wherein the holes are positioned around a perimeter of the sheet of ballistic fabric, and wherein the holes are configured to accept corresponding fasteners therethrough. The holes may form an evenly spaced apart array of holes around the perimeter and may be inset by an inset distance from the perimeter, wherein the inset distance from the perimeter may be a consistently equal distance. For example, the spacing between the holes in the array may be in the range of substantially two to six centimeters (one to three inches), and wherein the inset distance may be in the range of substantially two to four centimeters (one to two inches). The sheet of ballistic fabric may have a shape in planform chosen from the group which includes circular, quadrilateral, triangular.

The coiled sheet of ballistic fabric has open ends of the opposite open ends of the cylinder formed by the coiled sheet. The size of the opening at each of the opposite open ends of the coiled sheet is regulated by how tightly the coiled sheet of ballistic fabric is coiled so as to define a gas escape through-way for pressurized gas from the detonation of the implosion sleeve or deadend to exit the openings. Fasteners are fastened through the holes in adjacent layers of the coiled sheet to retain the cylindrical ballistic shield mounted on the implosion sleeve or dead-end until the detonation of the implosion sleeve or dead-end.

The present disclosure includes a method of using the implosion shield described herein once the implosion sleeve or dead-end has been installed on a power line. The method includes:

(a) selecting the desired number of layers of the sheet of ballistic fabric that will result from the sheet of ballistic fabric being coiled onto the implosion sleeve or dead-end, (b) selecting the size of the sheet of ballistic fabric to accomplish the selected number of layers of the sheet of ballistic fabric once wrapped onto the implosion sleeve or dead-end, and (c) using fasteners through holes in the sheet of ballistic fabric, installing and securing the implosion shield by coiling the selected number of layers of the sheet of ballistic fabric over and around the installed implosion sleeve or dead-end so as to cover at least the exposed horizontal sides of the implosion sleeve or dead-end with the selected number of the layers of the sheet of ballistic fabric.

The number of layers of the sheet of ballistic fabric, which for example may be between substantially two to four coiled layers, are selected to provide a sufficient numbers of layers once coiled around the implosion sleeve or dead-end so as to attenuate shock, pressure and sound waves emanating from detonation of the implosion sleeve or dead-end and so as to, at least partially, direct the pressurized gas emanating from the detonation from the open ends at each opposite end of the coiled layers of the sheet of ballistic fabric. Advantageously, the number of layers coiled around the implosion sleeve or dead-end are sufficient to direct a shock wave from the detonation of the implosion sleeve or dead-end parallel to the power line.

BRIEF DESCRIPTION OF THE DRAWINGS

A more complete understanding of the present disclosure and benefits thereof may be acquired by referring to the follow description taken in conjunction with the accompanying drawings wherein like reference numerals depict corresponding parts in each view, in which.

DETAILED DESCRIPTION

Turning now to a detailed description of the present teachings with reference to the accompanying FIGs., features and concepts also may be manifested in other arrangements and so the scope of the teachings is not limited to the embodiments described or depicted in the FIGs. The following examples of certain embodiments of the teachings are provided. Each example is provided by way of explanation of the teachings, one of many examples of the teachings, and the following examples should not be read to limit, or define, the scope of the teachings.

Figures 1A, 1B:
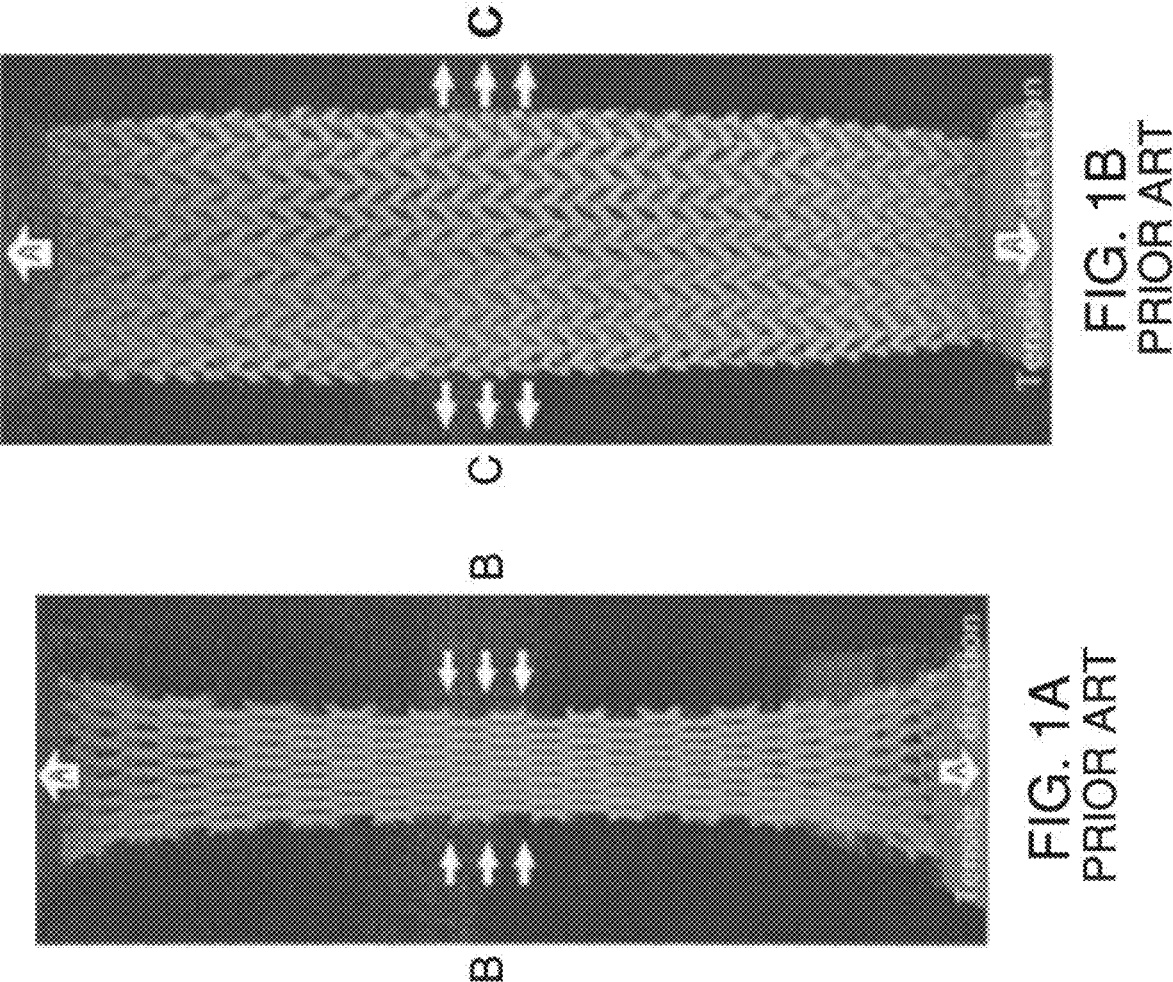
FIG. 1A illustrates the laterally constricting effect of a longitudinal tensile force acting on a length of conventional (positive Poisson's ratio) knitted fabric.
FIG. 1B illustrates the laterally expanding effect of a longitudinal tensile force acting on a length of auxetic (negative Poisson's ratio) knitted fabric.

FIG. 1A illustrates, as is known in the prior art, the laterally constricting effect of a longitudinal tensile force acting on a length of conventional (positive Poisson's ratio) knitted fabric. FIG. 1B illustrates, as is also known in the prior art, the laterally expanding effect of a longitudinal tensile force acting on a length of auxetic (negative Poisson's ratio) knitted fabric. The usefulness of the laterally expanding effect of auxetic materials when put in longitudinal tension is discussed below in relation to embodiments of implosion sleeves according to this disclosure.

Figure 2:
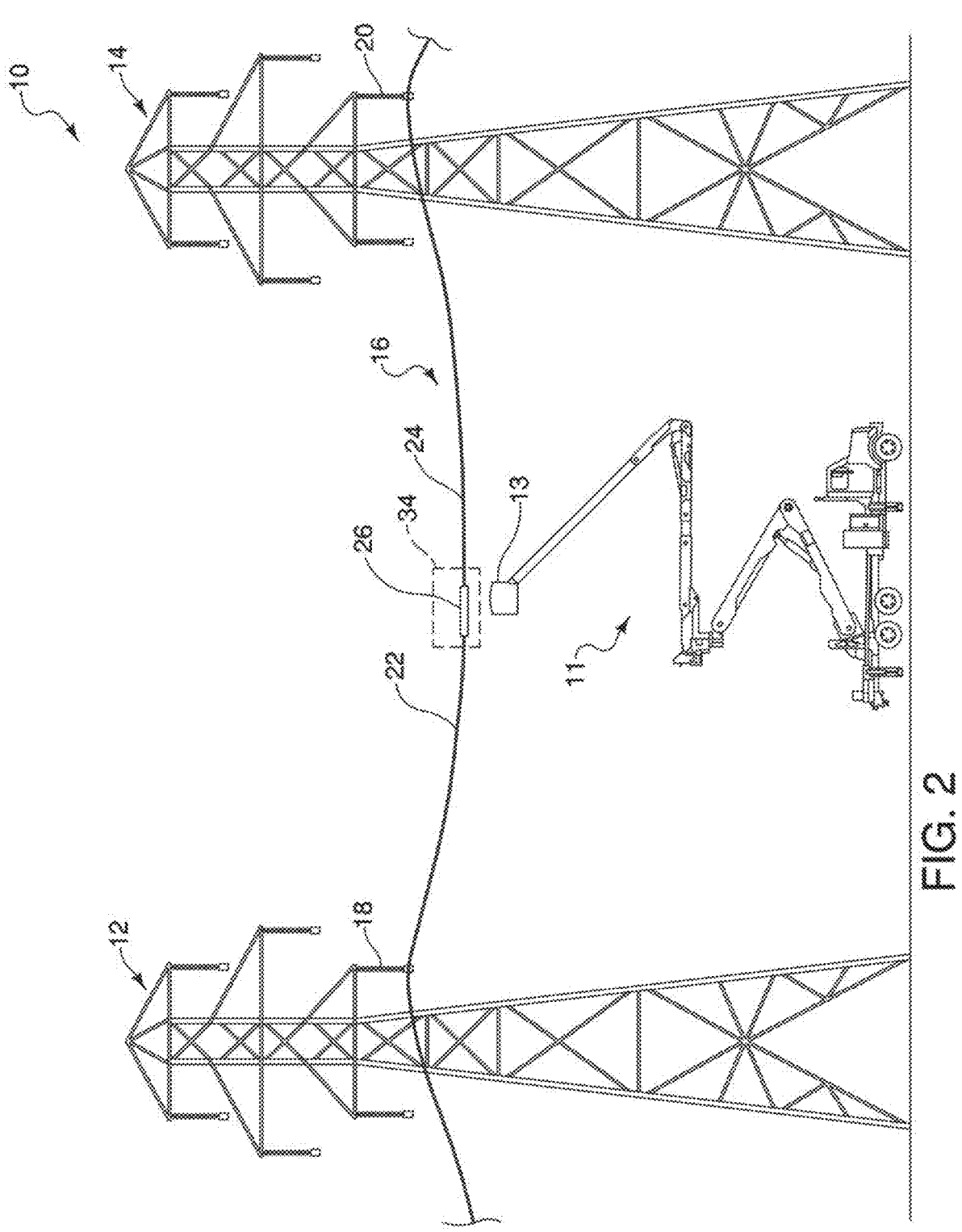
FIG. 2 is a perspective view of a power line supported between two support structures, with an implosion shield (shown in dotted outline) mounted over and around an implosion sleeve installed ready for an implosion splice to the two ends of the conductors held within the implosion sleeve, in accordance with the present disclosure.

FIG. 2 depicts an example of an outdoor electrical power line 10 with an electrical conductor 16 attached to electrical power line structures 12 and 14. Electrical conductor 16 is attached to power line structure 12 using an insulator or insulators 18, and to power line structure 14 using an insulator or insulators 20. Due to extreme lengths of electrical conductors used in delivering electricity, electrical conductor 16 may be separate pieces joined together to form electrical conductor 16. As an example, electrical conductor 16 may be an electrical conductor 22 and electrical conductor 24 joined together by an implosion sleeve 26. Implosion sleeve 26 may be used to join conductor 22 and conductor 24 when a linemen or persons residing within bucket 13 of bucket truck 11 installs implosion sleeve 26 into place on each loose end of conductor 22 and conductor 24. FIG. 2 also depicts an implosion shield 34 in place over and around implosion sleeve 26, in accordance with teachings of the present disclosure. Implosion shield 34 may be manufactured from an explosion or blast reduction type of material, as will be explained herein.

Figure 2A:
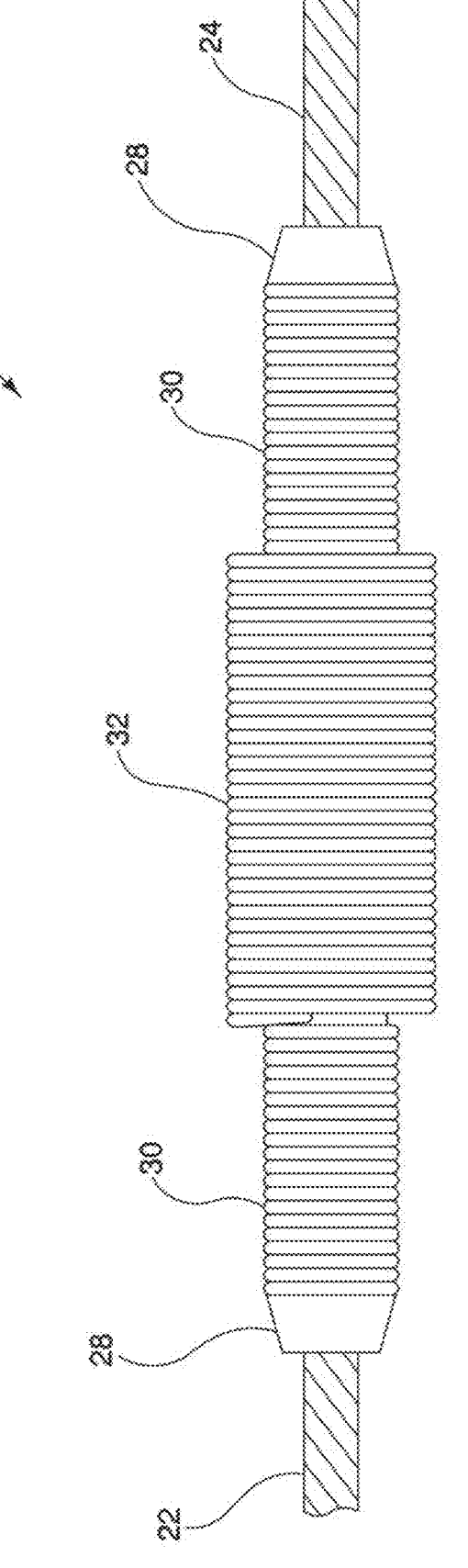
FIG. 2A is an enlarged view of the implosion sleeve of FIG. 2, showing a side view of the implosion sleeve in accordance with the present disclosure.

FIG. 2A depicts a larger view of implosion sleeve 26 whose subcomponents may be an aluminum tube 28 that is surrounded or wrapped by an explosive product 30. Explosive wrap product 30 advantageously may be detonation cord that is tightly wrapped around aluminum tube 28, for approximately the entire length of aluminum tube 28. An additional layer of explosive wrap product 32 (advantageously also detonation cord) may be wrapped around layer of explosive product 30, preferably centralized along tube 28 as depicted in FIG. 2a to ensure an effective implosion to join electrical conductor 22, electrical conductor 24 and implosion sleeve 26 to form a properly welded, melted, fused and compressed joint between the adjacent, opposed facing ends of electrical conductor 22 and electrical conductor 24, and aluminum tube 28 of implosion sleeve 26. Alternatively, explosive wrap product 32 may additionally act as a protective wrap to keep explosive product 30 in place in the central position of implosion sleeve 26.

Figure 3:
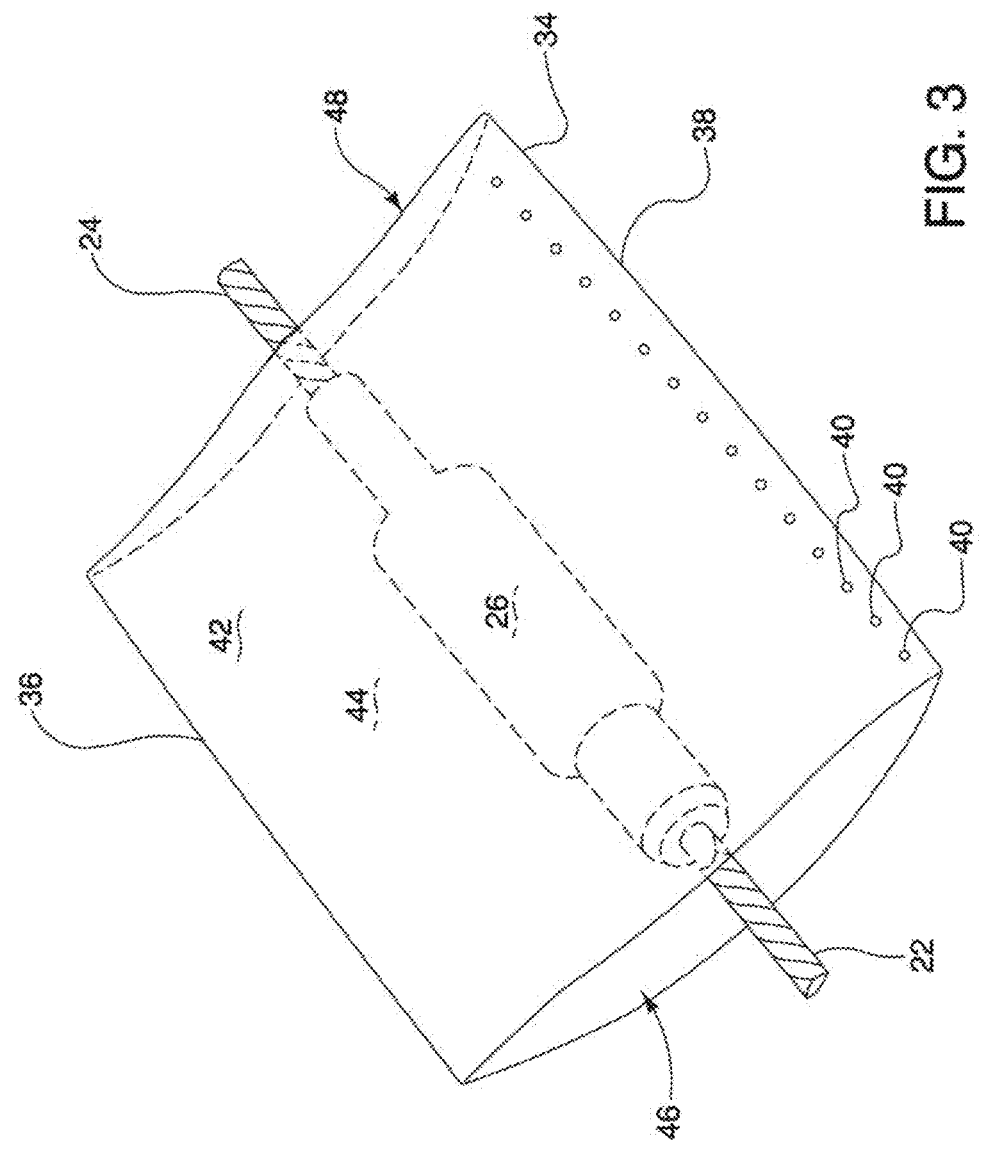
FIG. 3 is a perspective view of an implosion shield of a single sheet of ballistic fabric enveloping an implosion sleeve in accordance with the present disclosure.

FIG. 3 depicts implosion sleeve 26 within an implosion shield 34. Implosion shield 34 may preferably be made of a ballistic fabric. Ballistic fabric is a fabric that is capable of absorbing and deflecting the heated and pressurized gases emanating at high velocity from a detonation form of explosion and capturing or slowing the escape of fragmentation from the explosion, depending upon its arrangement relative to an explosion. Energy of a high velocity projectile impacting the ballistic fabric is absorbed by the ballistic fabric. To be effective, ballistic fabric is woven of yarn that stretches at relatively low strain rates before reaching its yield stress. An explosion causes a longitudinal stress to be transmitted through a yarn pair, which allows the whole or entire yarn in a ballistic fabric to absorb the loading caused by an explosion. In other words, stress and strain loading at one location in the fabric is absorbed by a delocalized portion of, or at least more of the fabric structure than the local impact point. Relative to other fabrics, ballistic fabric absorbs greater energy as work is performed on more of the fabric than just the localized fabric surrounding the impact zone.

Advantageously, the ballistic fabric of the present disclosure and teachings may be an auxetic structure or material. An auxetic structure or material is one that has a negative Poisson's ratio, which means that it is a structure or material that increases in dimension (e.g. becomes wider or thicker) when a tensile force is applied perpendicular to that increase in dimension. The internal structure of the material is designed or exists in such a way that deformation increases perpendicular to a uniaxial load. An example of auxetic knitted fabric having these auxetic characteristics is described in published US patent application no. 20120129416, entitled Auxetic Knitted Fabric. As would thus be known to one skilled in the art, auxetic knitted fabric expands or widens in a direction perpendicular to tension pulling on the yarn in knitted fabric. An example, for the sake of illustrating a comparison of the behavior of conventional knitted fabric versus auxetic knitted fabric, is illustrated in FIGS. 1A and 1B. In FIG. 1A, a tensile force in direction A pulls the yarn in conventional, positive Poisson's ratio, knitted fabric longitudinally. The result of the pulling in direction A is a lateral constriction of the fabric in direction B, tending to close the spacing or holes between the yarn fibers. In FIG. 1B on the other hand, the same tensile force in direction A pulling the yarn longitudinally in auxetic, negative Poisson's ratio, knitted fabric results in a lateral widening of the fabric in direction C. This widening tends to open the spacing or holes between the yarn fibers.

The characteristics of auxetic knitted fabric may be advantageous in use as an explosive shield because, if an axial tensile load caused by an explosion is along the longitudinal axes of parallel yarn fibers making up the auxetic knitted fabric, then the expansion of the auxetic knitted fabric perpendicular to the longitudinal axes of the yarn may be designed to open apertures between adjacent yarn fibers for so long as the axial load is maintained on the yarn. The opening of apertures between adjacent yarn fibers across the width of the fabric is useful for explosion attenuation as it allows some of the pressurized heated gases produced by the detonation explosion to escape through the widened apertures. This expansion of the auxetic fabric may assist in reducing the need to otherwise channel or dissipate those gases to reduce the explosive gas pressure. Preferably the auxetic knitted fabric is resilient so that, once the tensile axial loading on the yarn dissipates, the expansion of the fabric perpendicular to the long axes of the yarn will cease and the fabric may then return to its undeformed dimensions, thereby closing the apertures between the yarn until the next loading event. The implosion shield may thus be reusable.

As described at meridian.us by Meridian Global Consulting, located in Mobile, Alabama, USA, who are a supplier of auxetic ballistic fabric, a ballistic fabric may be constructed of parallel yarns, where each yarn has its own independent wrap of fibers weaved, for example helically wound, around the yarn. For example, the wrap fibers may be aramid fibers or the like such as sold under the trademark Spectra (tm). When a high velocity projectile from an explosion strikes the auxetic ballistic fabric, the yarns are loaded by stretching and absorb the resulting stress in the yarns. The wrap fibers woven around the yarn under strain also absorb some of the strain energy, as the yarn is in tension and expands or grows into the wrap fibers. Strain energy transferred into the wrap fiber weaves is enhanced, and thus strain energy transferred into the entirety of a piece of auxetic ballistic fiber is enhanced. The Meridian auxetic ballistic fabric may be used in accordance with the present teachings, to provide the implosion shields depicted and discussed in accordance with the present teachings.

Figure 5:
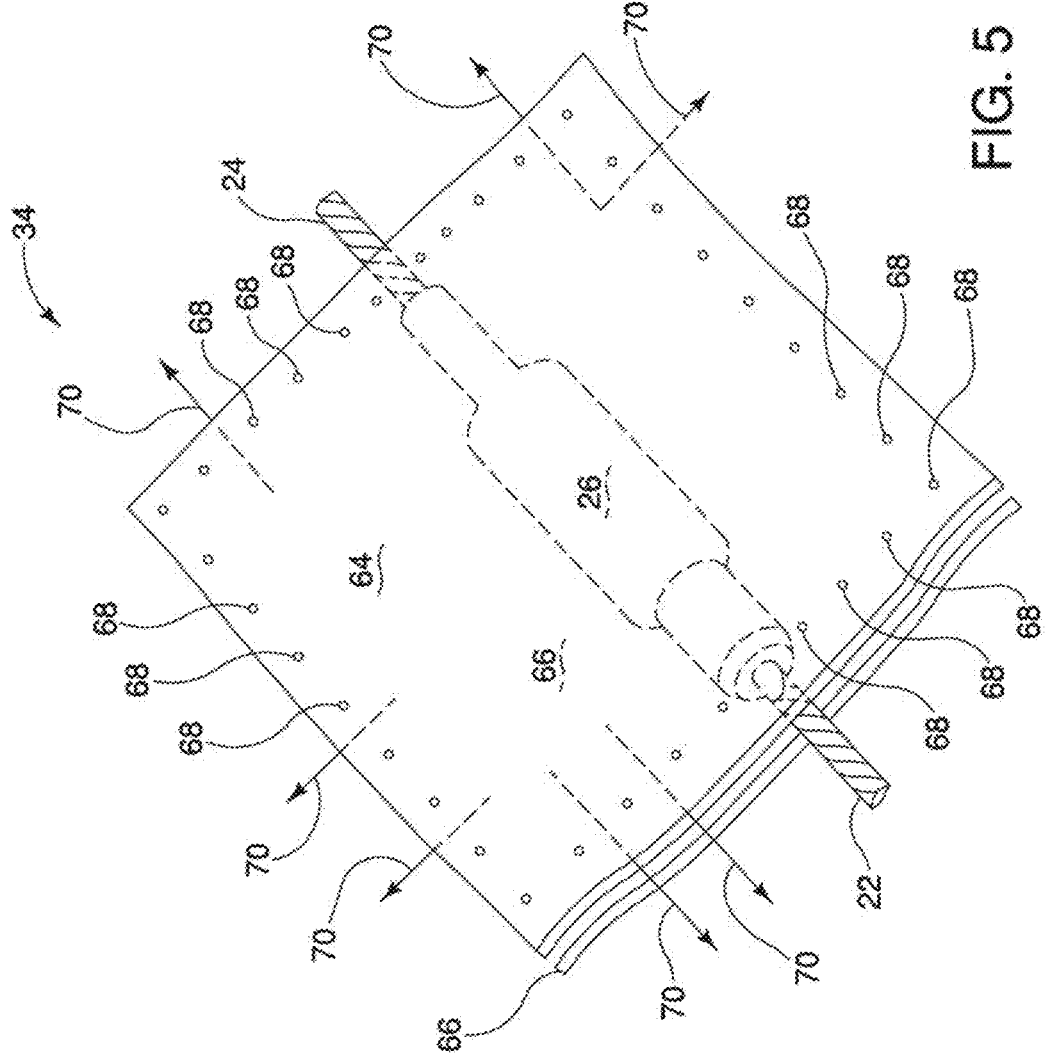
FIG. 5 is a perspective view of an implosion shield of multiple sheets of ballistic fabric surrounding an implosion sleeve in accordance with the present disclosure.

Continuing with FIG. 3, in one embodiment, implosion shield 34 may be made from a single, for example rectangular piece (or layered sandwich of pieces, which may be quilted, such as seen in FIG. 5) of ballistic fabric that is folded once around implosion sleeve 26. Preferably the ballistic fabric is auxetic ballistic fabric. Thus, edge or fold 36 is where the ballistic fabric of implosion shield 34 would double-back or fold-over on itself. Edge 38 is then the mating location where the loose ends, distal from fold 36 of the ballistic fabric of implosion shield 34 may be fastened to one another. Thus, a fastener 40, or series of fasteners 40, may be used fasten edge 38 closed or loosely closed to thereby secure implosion cover 34 over implosion sleeve 26. In this folded, envelope embodiment depicted in FIG. 3, implosion shield 34 may then be described as an envelope having a first side 42 and a second side 44 mounted on opposite sides of implosion sleeve 26.

Fastener 40 may advantageously be made of resilient and flexible material, for example so as to fasten by means of stitching to reduce the risk of hard fragmentation should the fasteners 40 deform, break or disintegrate upon detonation of the implosion sleeve 26. If implosion shield 34 is designed to avoid fragmentation of fasteners 40, for example if the dimensions of shield 34 are large enough, then fasteners 40 may alternatively be rigid fasteners, for example including rivets, staples, threaded fasteners such as nuts and bolts, carabiners or other clips, or other rigid fasteners to secure together edge 38 of implosion shield 34. While edge 36 and edge 38 are closed edges, adjacent sides of the envelope of implosion shield 34 are open as exhibited by opposite openings 46 and 48. The envelope is hollow, and the area and volume within the envelope between opening 46 and opening 48 sufficiently voluminous to provide a gas pass-through or open directional conduit to permit the exit from implosion shield 34 of explosion gases from the detonation of implosion sleeve 26, as will be explained in better detail below.

Figure 4:
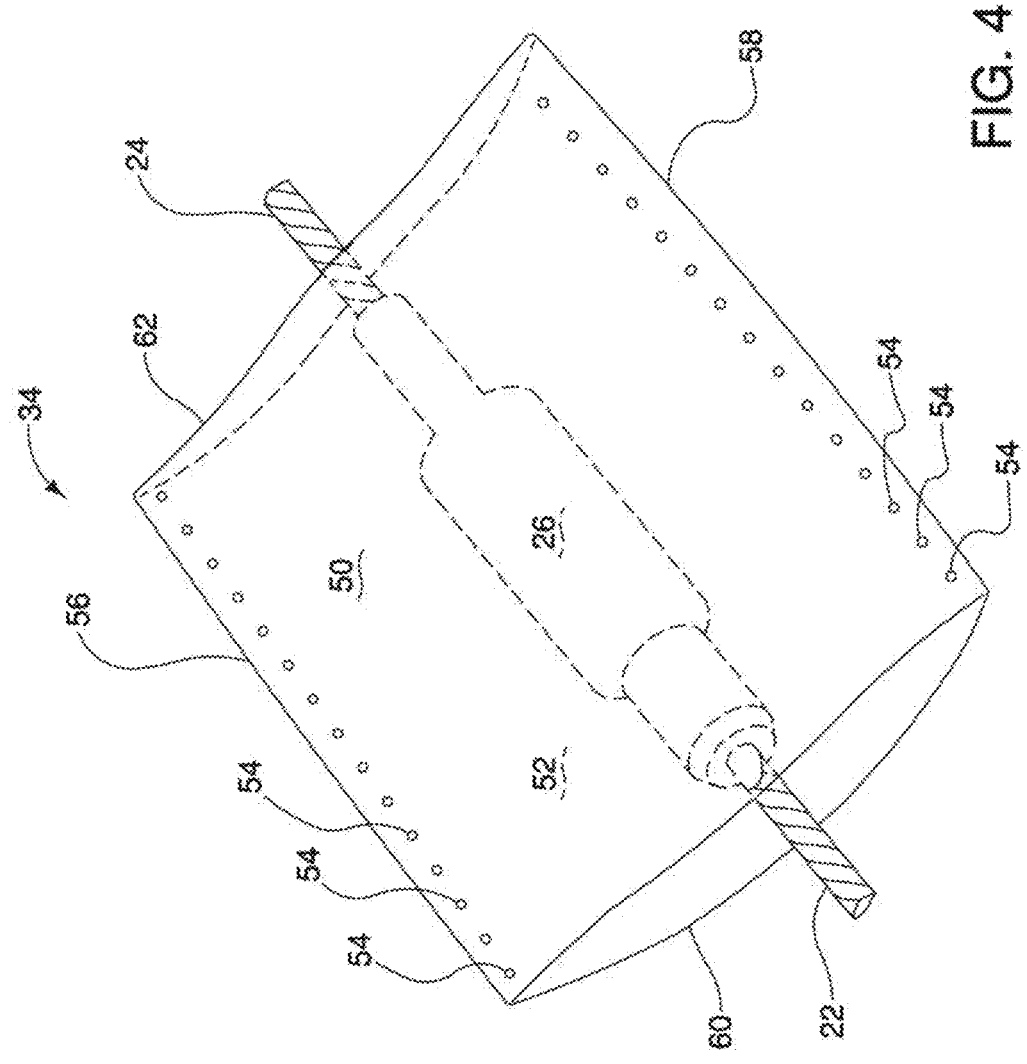
FIG. 4 is a perspective view of an implosion shield of two sheets of ballistic fabric enveloping an implosion sleeve in accordance with the present disclosure.

FIG. 4 depicts an embodiment similar to the envelope embodiment of FIG. 3. In FIG. 4, instead of a single piece or single layered sandwich of ballistic fabric having a fold at edge 36, FIG. 4 depicts two pieces of ballistic fabric, or two pieces of layered ballistic sandwich, joined or fastened together to form an envelope shaped shield 34. First ballistic side panel 50 and second ballistic side panel 52 are located on opposite sides of implosion sleeve 26. Panels 50 and 52 are joined to one another to form an open-ended envelope using fasteners 54 along opposite edges 56 and edge 58. Fasteners 54 may be the same as the fasteners 40 used in the embodiment of FIG. 3. Similar, to the open-ended envelope of FIG. 3, edges or sides adjacent to, and extending between, edge 56 and edge 58 may be fully or partially open to permit the free flow of escaping high pressure gases caused by the detonation of implosion sleeve 26. As with the embodiment of FIG. 3, shock waves and accompanying sound waves due to the detonation of implosion sleeve 26, which although may partially escape attenuation to the extent that the shock and sound waves escape through open ends 60 and 62, will for the most part impact ballistic side panels 50 and 52 so as to be attenuated by the ballistic fabric in the panels as the shock and sound waves pass through the panels. Gas flow may also partially escape between the fastened edges 56, 58 assuming only a somewhat loose fastening of those edges by fasteners 54. Simultaneous with the gas expansion, and radiation of the shock and sound waves from the detonation, any fragmentation will mostly be contained by ballistic side panels 50, 52 and along edges 56, 58.

As referred to above, FIG. 5 depicts another envelope embodiment, although in this embodiment closed or fastened together circumferentially all around it's edges, in which two or more separate pieces of ballistic fabric (two are depicted for sake of clarity in the drawings), each acting as one half of implosion shield 34 are mounted to each other to form a closed envelope adapted to be mounted over an implosion sleeve 26. In particular, ballistic panels 64 and 66 are located on opposite sides of implosion sleeve 26 and fastened to one another by fasteners 68 so as to securely place ballistic panels 64 and 66 around, to completely envelope, implosion sleeve 26. Fasteners 68 may be the same as fasteners 40 or fasteners 54, except that fasteners 68 will advantageously not seal the edges so as to leave gas escape pathways 70 through the fasteners around some or all of the entire circumferential edge or periphery of the implosion shield 34 formed from ballistic panels 64 and 66.

When implosion sleeve 26 is detonated, ballistic panels 64 and 66 prevent the escape of some or all of any fragmentation debris, and also lessen or attenuate the detonation sound waves, pressure waves and shock waves caused by detonation of implosion sleeve 26. By lessening or attenuation of the pressure waves, it is meant that the measured air pressure on the exterior sides of ballistic panels 64 and 66 (external in the sense of being opposite to the sides adjacent to implosion sleeve 26), will be less than the air pressure if measured on the interior of ballistic panels 64 and 66; that is, adjacent to implosion sleeve 26 during and immediately after detonation of implosion sleeve 26.

Regardless of the configuration of an implosion shield according to the present teachings, for example those in the various depicted embodiments, when an implosion shield according to this description is positioned and oriented according to this description between a bystander and a detonating implosion sleeve 26, the sound wave, pressure wave, and shock wave, experienced by the bystander as a consequence of the detonation are all reduced in amplitude and impact on the bystander as compared to if the implosion shield were not used.

Figure 6:
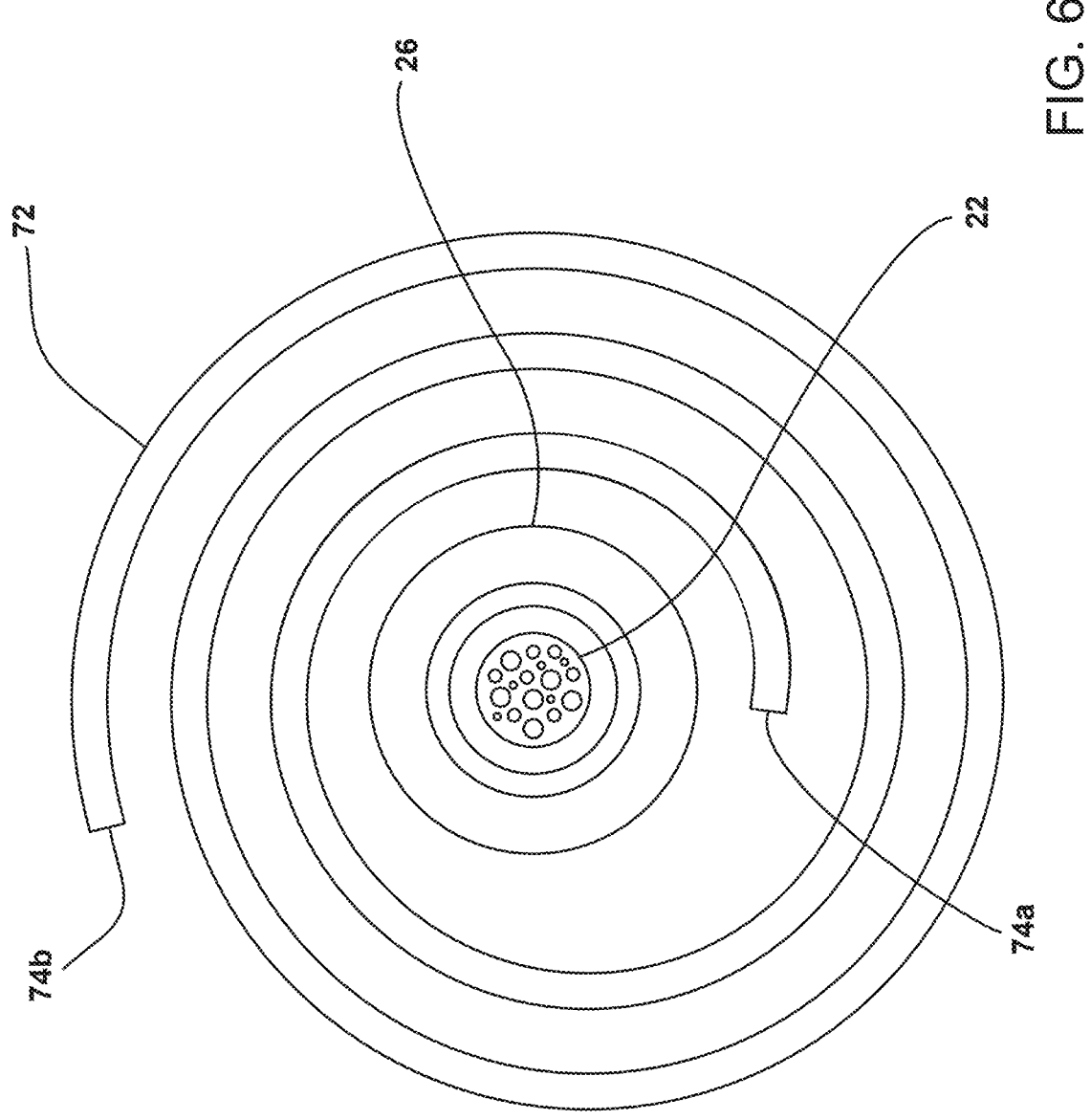
FIG. 6 is an end view of an implosion shield rolled or wrapped around an implosion sleeve in accordance with the present disclosure.

FIG. 6 depicts another embodiment of the disclosure in which a single sheet or sandwiched piece of ballistic fabric, which may for example be rectangular, can be secured, fixed or otherwise mounted around implosion sleeve 26 by wrapping or rolling ballistic fabric about an implosion sleeve 26 to form an approximately cylindrical wrapped implosion shield 72. FIG. 6 is an end view (viewed in section through and along a power line 22) of implosion sleeve 26 mounted on the conductor ready for the implosion splicing, depicting wrapped implosion shield 72 in its wrapped-around or rolled installation position around implosion sleeve 26. Wrapped implosion shield 72 provides at least one advantage over other embodiments of implosion shield 34 in that the number of layers of ballistic fabric can be selected and adjusted by adjusting the number of wraps of ballistic material, between the most internal edge 74a of the wrap and the most external edge 74b of the wrap, so as to provide optimized blast, debris and fragmentation, sound wave, pressure wave and shock wave protection to the area outside or beyond the implosion shield 72 during a detonation of implosion sleeve 26.

Figure 7:
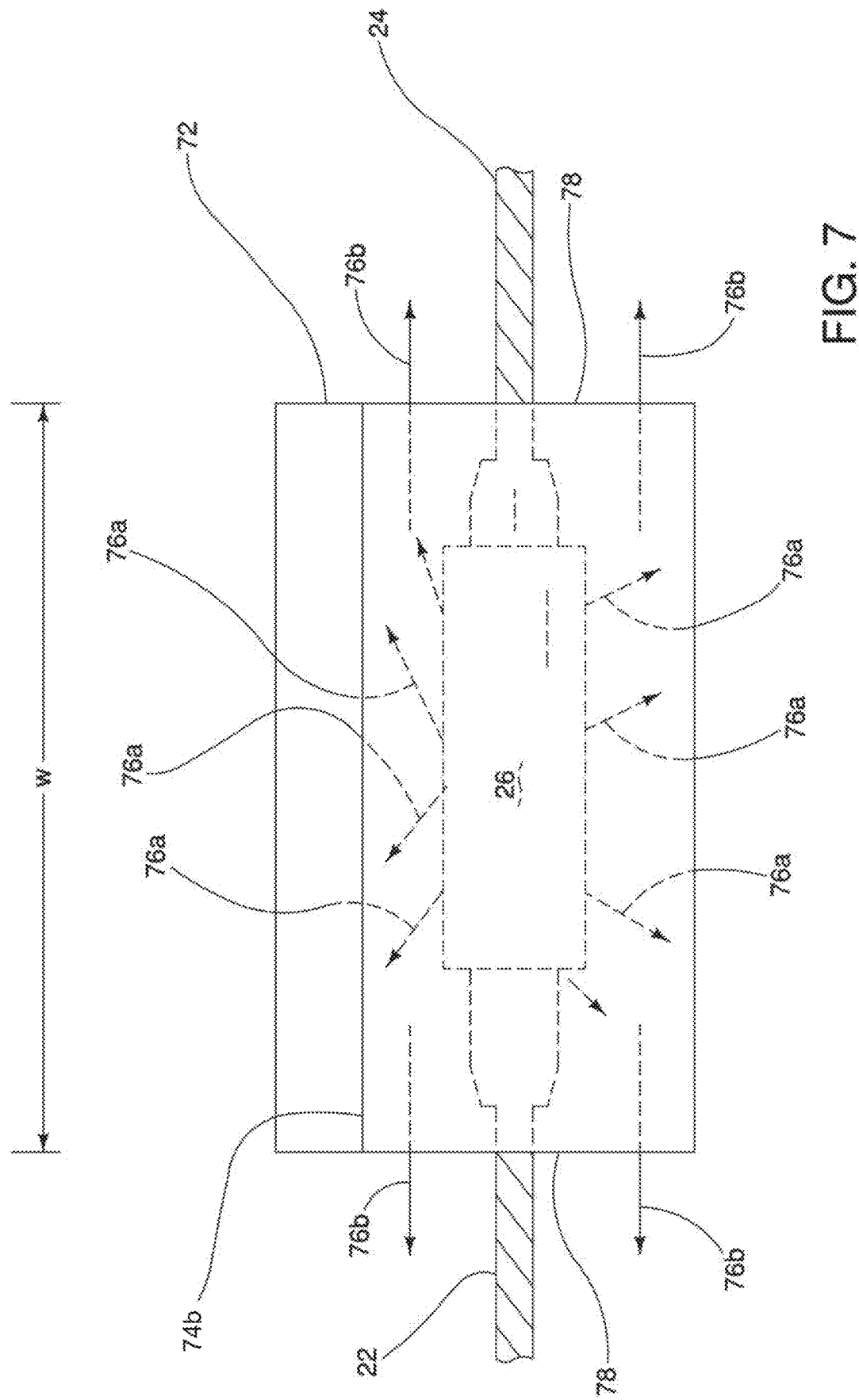
FIG. 7 is a top view of FIG. 6 of an implosion shield rolled or wrapped around an implosion sleeve in accordance with the present disclosure.

FIG. 7 is a side view of the wrapped implosion shield 72 of FIG. 6 depicting implosion sleeve 26, shown in dotted outline, with a single piece of ballistic fabric, which may be rectangular, wrapped around implosion sleeve 26. Explosion debris, accelerated pressurized gases from the explosion, shock and pressure waves, and sound waves produced as a result, of detonating the detonation cord on implosion sleeve 26, are managed by wrapped implosion shield 72 so as to reduce the severity of their external impact. Heated gas flow paths are depicted diagrammatically in FIG. 7 so as to show generally the re-direction of the gas flow paths from their initial radially outward paths 76a relative to the detonation of the implosion sleeve 26, so as to be redirected to escape paths 76b exiting the opposite ends 78 of the wrapped implosion shield 72, generally parallel with the conductors 22, 24. Thus, debris falling to the ground may be lessened, sound may be attenuated, and shock and pressure waves reduced when employing wrapped implosion shield 72.

Figure 8:
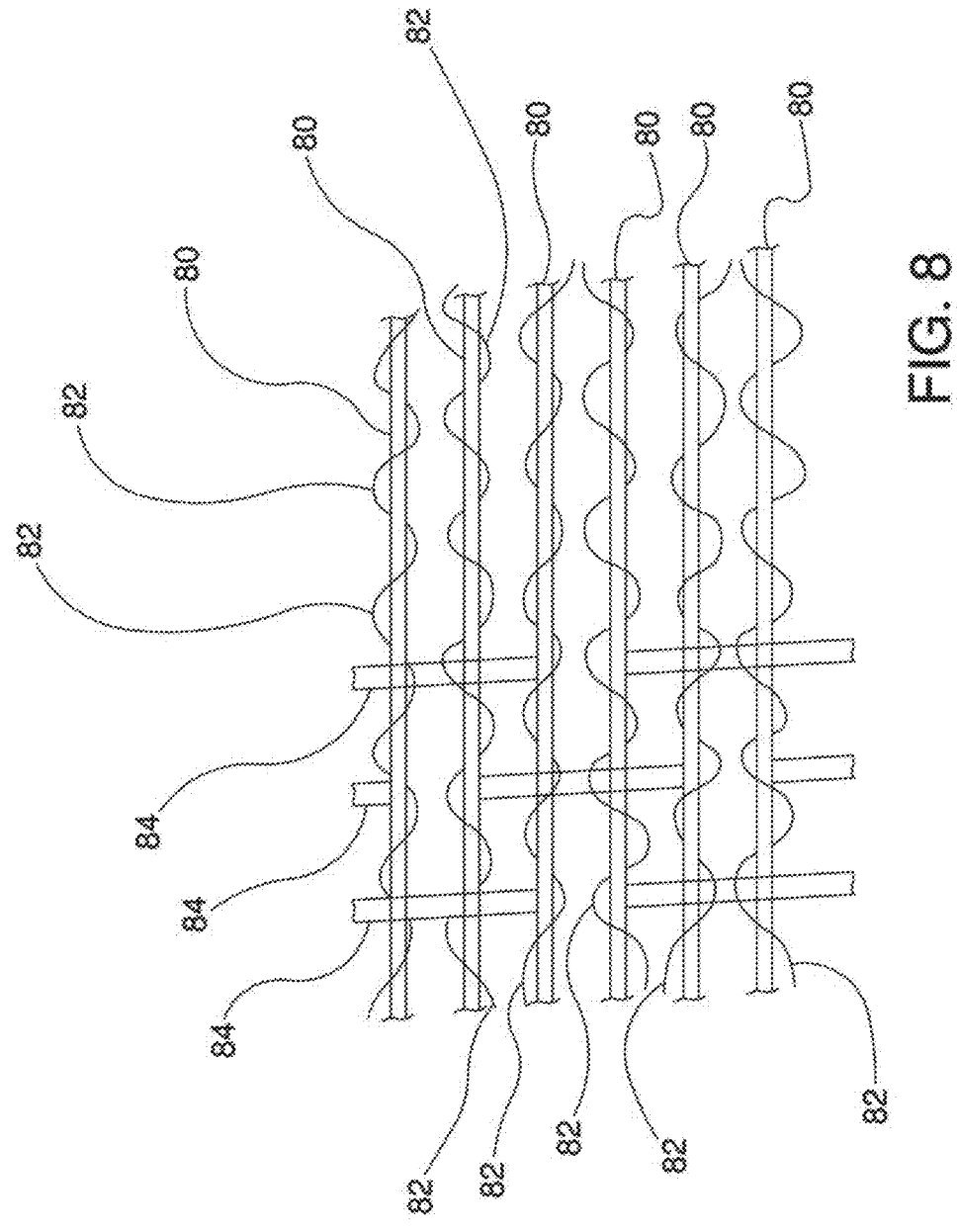
FIG. 8 is a top view of material of an implosion shield in accordance with the present disclosure.

FIG. 8 depicts how the material of implosion cover 34 could be woven or configured if an implosion shield ballistic material for implosion shield 34 is not sourced commercially. Core fibers 80 and wrap fibers 82 may be configured as depicted in FIG. 8. That is, a single wrap fiber 82 may simply wrap or wind helically around a single core fiber 80. Parallel core fibers 80 may be joined or woven together with connecting fibers 84, which weave as depicted, alternating in crossing above two core fibers 80, and then crossing under the next adjacent two core fibers 80, and so on to continue in that fashion for the entire width of implosion shield 34. The material used as an implosion shield may advantageously meet the U.S. military specification standard MIL-STD-2105.

Where the wrapped implosion shield 72 uses auxetic ballistic material, the structure of which may be as described above in respect of FIG. 8, in applicant's view it may be advantageous to align the longitudinal axes of core fibers 80 along the length of wrapped implosion shield 72 so that, as the wrapped implosion shield is wrapped around the implosion sleeve 26, so too the core fibers 80 are similarly wrapped around the implosion sleeve 26. The result postulated by the applicant is that, upon detonation of the implosion sleeve 26, the rapidly expanding hot gases expanding radially in path directions 76a put the core fibers 80 into tension as the coil of the wrap is tightened due to the high pressure within. Because the ballistic fabric is auxetic, tensioning of the core fibers along their length will result in expansion of the width w, seen defined in FIG. 7, of the wrapped ballistic fabric forming wrapped implosion shield 72. The increase in width w will, it is postulated, open up apertures between core fibers 80, thereby allowing the outwardly expanding hot pressurized gases to escape through the wrap while still attenuating the pressure wave and catching debris. The shock wave, because too according to applicant's information that it radiates more quickly and ahead of the pressure and sound waves, would be most effectively attenuated before the auxetic fabric could react and fully expand its width. Advantageously, the auxetic ballistic material is resilient so that, upon the gas pressure subsiding, the width w will return to its original dimension, thereby closing the apertures, and ready for re-use.

A method of utilizing an implosion cover 34 on a power line 10 may include installing an implosion sleeve 26 on an electrical conductor 22 and an electrical conductor 24 (i.e. a power line), such as by using a bucket truck 11 as depicted in FIG. 2, and then wrapping implosion shield 72 around implosion sleeve 26 as depicted in FIG. 6. The method of wrapping or coiling implosion shield 72 around implosion sleeve 26 may further include forming multiple layers, such as seen by way of example in FIG. 6, by continued wrapping of the ballistic fabric of implosion shield 72 around implosion sleeve 26 until the desired wrap density is achieved to optimize the attenuation of the effects of the anticipated blast intensity. The method may include using multiple, completely separate pieces of ballistic fabric that each are, and act as, an implosion shield. Such separate pieces may be square or rectangular sections that form an implosion shield when joined or fastened together, such as implosion shield 34 explained in connection with FIGS. 3, 4 and 5. The method may include securing the implosion shield 72 using fasteners such as described for fasteners 40, including stitching using plastic, nylon, or other natural or synthetic including aramid materials, such as sold commercially under the trademarks KEVLAR and Spectra. The method of utilizing an implosion shield according to aspects of the present disclosure may further include detonating the implosion sleeve, and attenuating shock, pressure and sound waves with the implosion shield.

Figure 9:
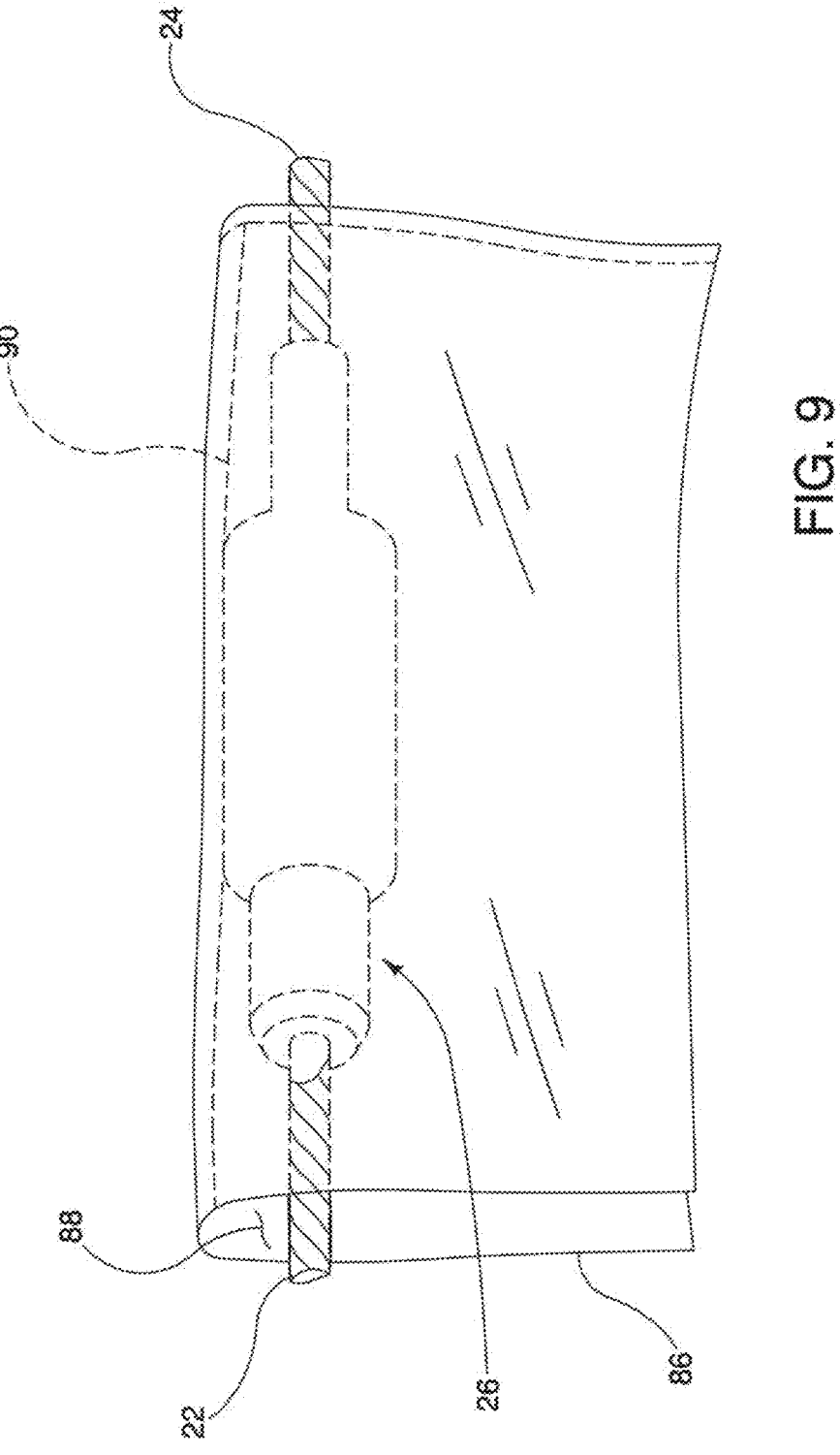
FIG. 9 is a perspective view of an implosion sleeve with an implosion shield draped over the implosion sleeve.

FIG. 9 depicts a perspective view of an implosion sleeve 26 with an implosion cover 86 draped over and draped around implosion sleeve 26. In the embodiment depicted in FIG. 9, implosion cover 86 is not supported by any type of frame, nor is formed as an envelope or wrapped, but is merely draped over or placed around implosion sleeve 26 such that an inside surface 88 of implosion cover 86 contacts a portion of implosion sleeve 26. More specifically, as an example, when implosion cover 86 is placed around implosion sleeve 26, a top inside fold edge 90 may contact an upper outside surface of implosion sleeve 26. With this arrangement, shock, pressure and sound waves, and any debris from detonating implosion sleeve 26 may be attenuated, lessened, or contained respectively due to the draped placement of implosion cover 86. If the lowermost edges of cover 86 hang sufficiently far below implosion sleeve 26, in one embodiment weights (not shown) may attached to or otherwise affixed to the lowermost edges to assist in holding the cover 86 in place before and during the detonation or (not shown) fasteners as described above may be used along bottom edges of cover 86 or along either side edges to join it together and keep it in place.

Figure 10:
FIG. 10 is a perspective view of an implosion sleeve with an implosion shield supported by a frame surrounding an exterior of the implosion sleeve.

FIG. 10 depicts a perspective view of an implosion sleeve 26 with an implosion shield 92 surrounding an exterior of the implosion sleeve 26. In the embodiment depicted in FIG. 10, implosion shield 92 may be supported by a frame, which may employ a top bar 94, and a first lower bar 96, and a second lower bar 98. In the embodiment depicted in FIG. 10, implosion cover panel 100 and implosion cover panel 102, may be two separate pieces of auxetic ballistic blast material, the same or similar to that explained in this disclosure, or the implosion cover instead may be a single piece of an auxetic ballistic blast material. Top bar 94 may support implosion cover panel 100 and implosion cover panel 102 if it is two pieces, or if it is one unitary piece. In either configuration, a first top clamp 104 and a second top clamp 106 may affix implosion cover panel 100 and implosion cover panel 102 to hold them in place at and to top bar 94. First lower bar 96 and second lower bar 98 may respectively secure implosion cover panel 100 and implosion cover panel 102 at their end's opposite to top bar 94. Top bar 94 may be supported using a first top bar support 108 and a second top bar support 110, which each may span the distance between top bar 94 and conductor 22 and conductor 24, respectively. First adjustment device 112 may be used to extend and retract first top bar support, and second adjustment device 114 may be used to extend and retract second top bar support 110. As examples, first top bar support 108 may secure to conductor 22 with clamp 124, and second top bar support 110 may secure to conductor 24 with clamp 126. First lower bar 96 and second lower bar 98 may be spaced apart and held in place using a first lower spacer bar 116 and a second lower spacer bar 118. First lower spacer bar 116 and second lower spacer bar 118 each may be adjusted to increase or decrease the space between first lower bar 96 and second lower bar 98 using adjustment device 120 and adjustment device 122, respectively, which may permit first lower spacer bar 116 and second lower spacer bar 118 to telescope, or otherwise account for spacing changes. With this arrangement, shock and pressure waves, noise waves, and any debris from detonating implosion sleeve 26 may be attenuated, lessened, directed or contained due to placement of implosion cover panels 100 and 102, if two covers are utilized, or alternatively if one continuous cover panel is utilized.

Figure 11:
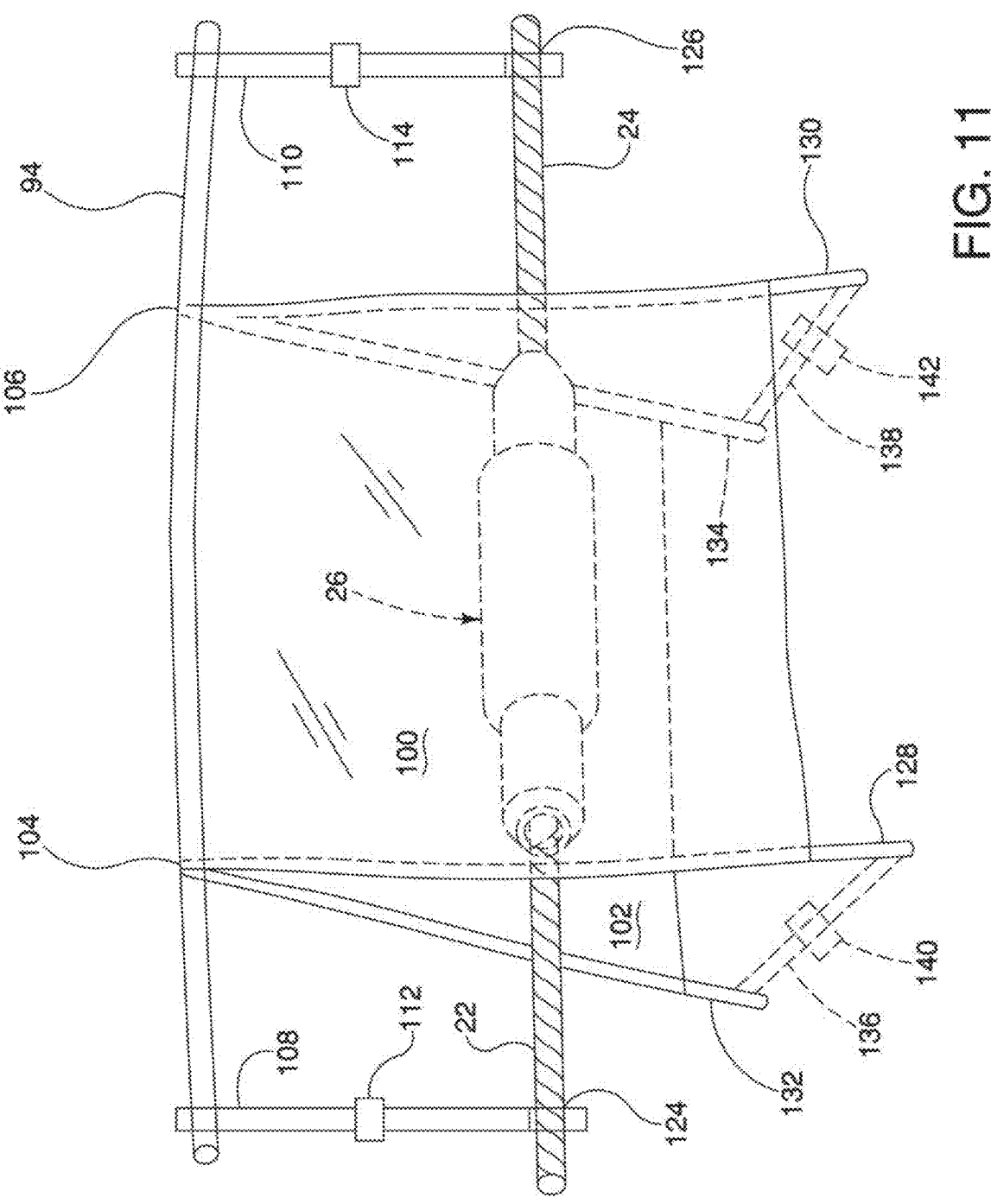
FIG. 11 is a perspective view of an implosion sleeve with an implosion shield supported by a frame surrounding an exterior of the implosion sleeve.

FIG. 11 depicts another embodiment in a perspective view of an implosion sleeve 26 with an implosion cover panel 100 and implosion cover panel 102 surrounding an exterior of implosion sleeve 26 configured for supporting the frame on the ground. Thus, in the embodiment of FIG. 11, an alternative frame arrangement is depicted when compared to FIG. 10. More specifically, top bar 94 and its connection and spacing from conductor 22 and conductor 24, are secured using first top bar support 108 and second top bar support 110, with each being adjustable using first adjustment device 112 and second adjustment device 114, respectively. As examples, first top bar support 108 may secure to conductor 22 with clamp 124, and second top bar support 110 may secure to conductor 24 with clamp 126. First top clamp 104 and second top clamp 106 may be used to secure implosion cover panel 100 and implosion cover panel 102 to top bar 94. Implosion cover panel 100 may be supported by a frame, which may be a first bar 128 and a second bar 130, while implosion cover panel 102 may be supported by a frame, which may be a third bar 132 and a fourth bar 134. With such a structure, like the embodiment of FIG. 10, an A-frame structure may be configured around implosion sleeve 26. To better stabilize the implosion cover panel 100 and implosion cover panel 102, a first cross bar 136 and a second cross bar 138 may be employed. A first cross bar adjustment device 140 and a second cross bar adjustment device 142 may be used to adjust the spacing between the ends of first bar 128 and third bar 132, and the ends of second bar 130 and fourth bar 134, respectively.

Figure 12:
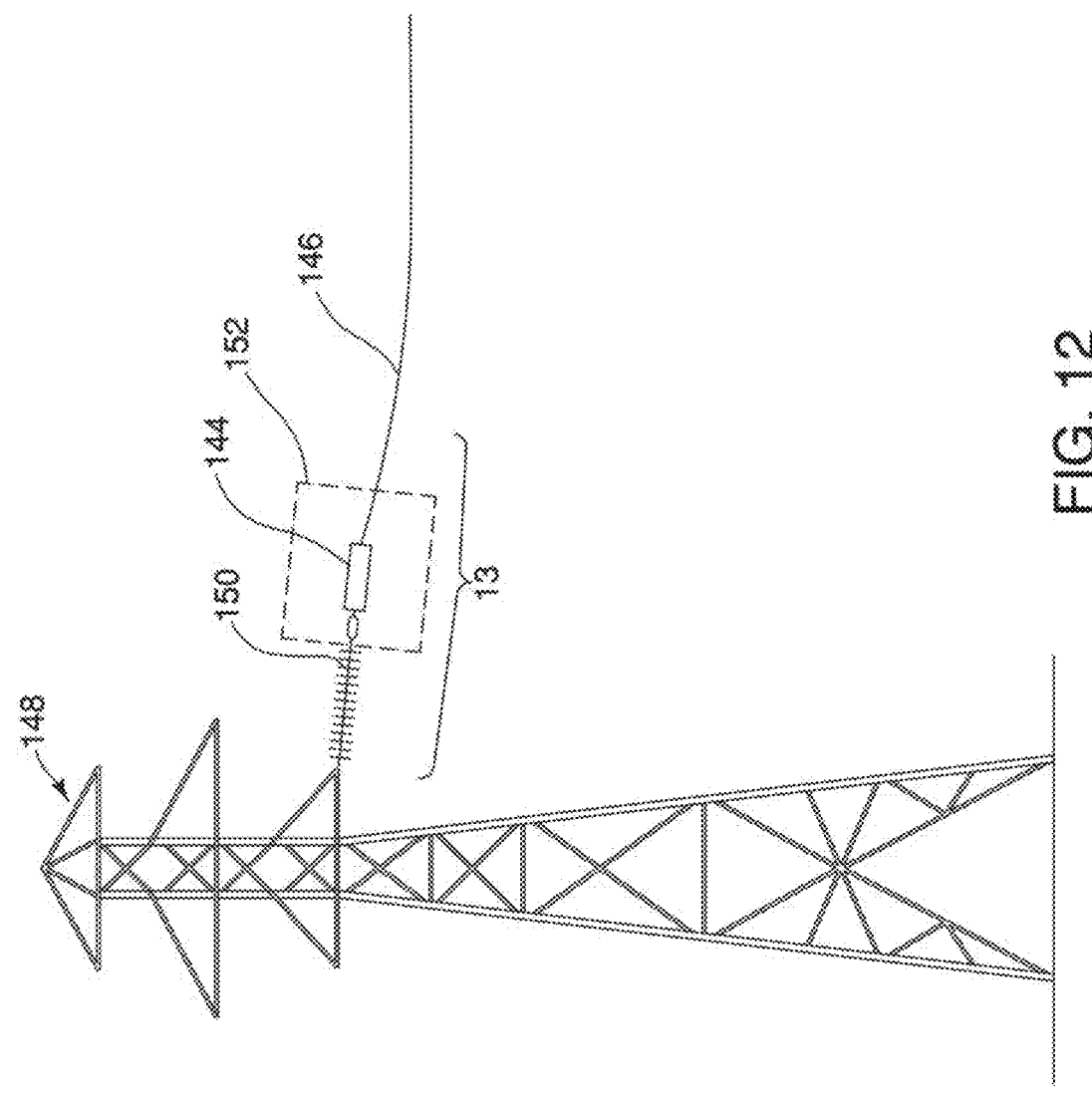
FIG. 12 is a perspective view of an implosion dead-end sleeve with an implosion shield terminating an electrical conductor to a dead-end structure.
Figure 12A:
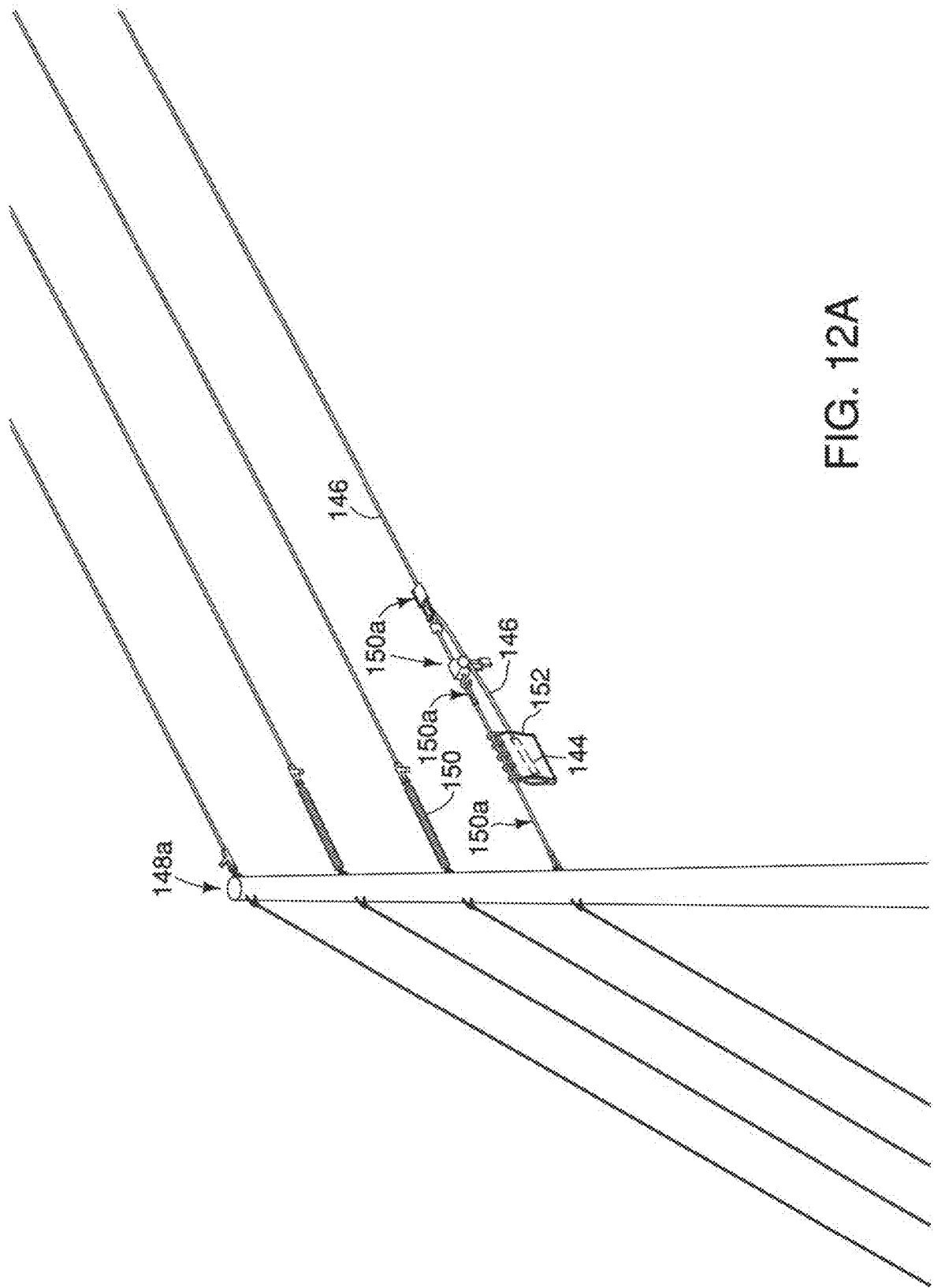
FIG. 12A is a perspective view of an implosion dead-end sleeve with an implosion shield terminating an end of a conductor at a dead-end on a dead-end support structure.

FIG. 12 is a perspective view of an implosion dead-end sleeve 144 terminating and connecting an electrical conductor 146 to a dead-end structure 148 using electrical insulator or insulators 150. More specifically, electrical conductor 146 is mechanically connected to implosion dead-end sleeve 144 using implosion techniques. Implosion dead-end sleeve 144 is mechanically connected to an electrical insulator or insulators 150, which is mechanically connected to dead-end structure 148, such as to a cross arm or other structural part of dead-end structure 148. Implosion dead-end sleeve 144 is used to terminate electrical conductor 146 and maintain tension in and of electrical conductor 146. Implosion cover 152 is depicted in dotted outline and may be used to completely cover and surround an exterior of implosion dead-end sleeve 144. By completely covering and surrounding an exterior of implosion dead-end sleeve 144, when it is imploded to secure a mechanical and electrical connection between electrical conductor 146 and electrical insulator or insulators 150, with implosion cover 152, any surrounding structures, hardware, insulators, rigging, tooling and equipment may be protected. For example, implosion cover 152 may be used as a barrier to protect insulator or insulators 150, which in FIG. 12, is a dead-end insulator or insulators because insulator or insulators 150 is installed on dead-end structure 148. Because implosion cover 152 is a physical barrier, it protects adjacent structures, rigging and tooling, such as dead-end insulators, conductor grips, hoists and slings used to support the electrical conductor 146 or tension in electrical conductor 146. Implosion cover 152 may also protect bypass jumpers (also known as bypass circuits) and permanent jumpers installed and used to carry line current and voltage, be it a dead-end sleeve or a midspan sleeve. Thus, any time an implosion sleeve or dead-end sleeve is installed, the conductor tension has to be supported (i.e. maintained), such as by using conductor grips, hoists and slings such as seen in FIG. 12A and collectively labelled 13                                                    14

Figure 14:
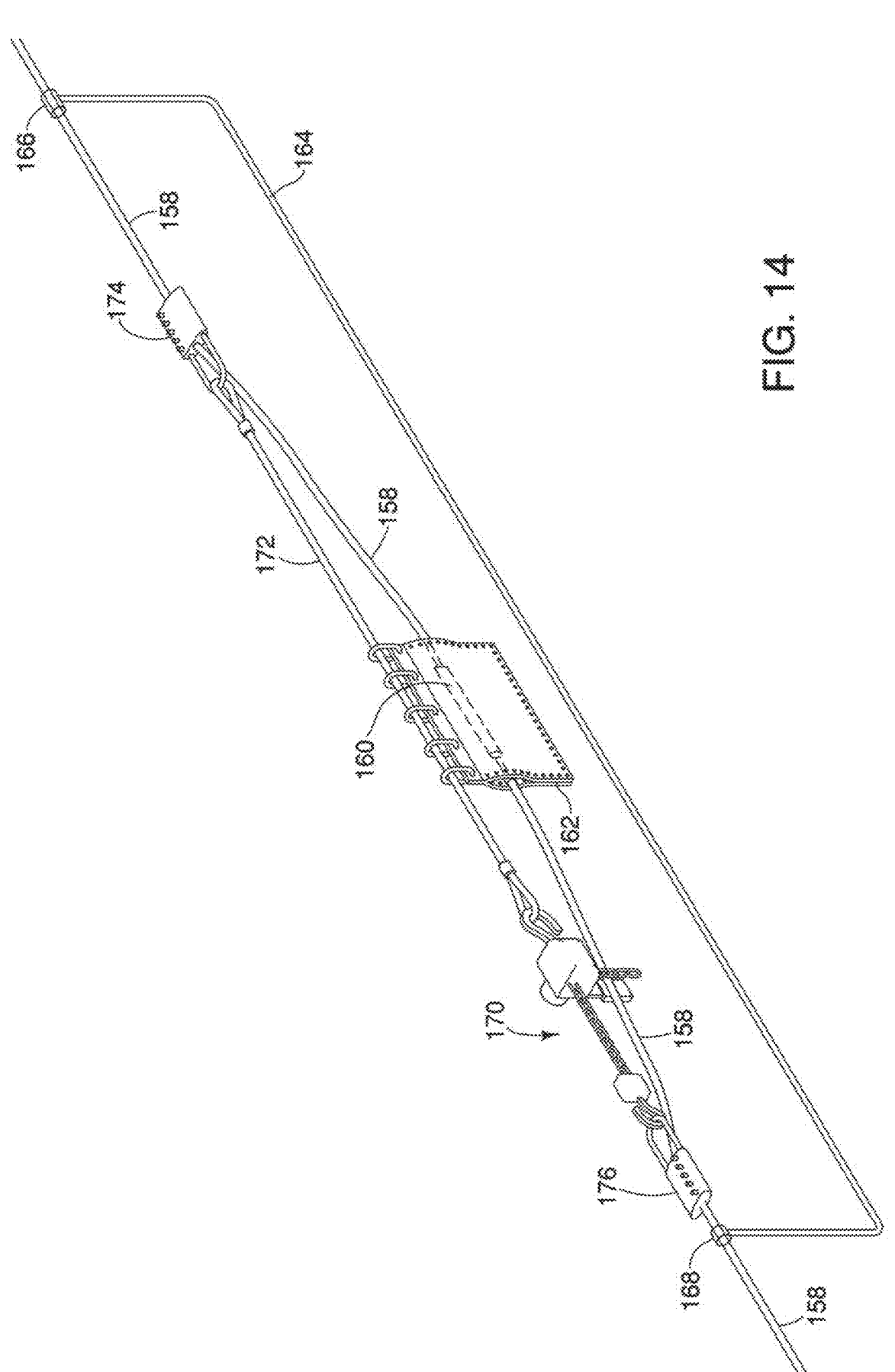
FIG. 14 is a perspective view of an implosion sleeve mounted between two conductor ends of a live conductor and encased in an implosion shield, wherein the live conductor is shown bypassed around the site of the implosion sleeve.

150a, wherein dead-end sleeve 144 is used to terminate the end of conductor 146 and the dead-end is supported on dead-end support structure 148a. If an implosion sleeve or dead-end sleeve is installed during an energized project, in which the electricity continues to pass through the electrical conductor, a conductive jumper such as seen in FIG. 14 has, to be run alongside to carry the load. This equipment is installed in parallel (electrically parallel, and physically parallel) to the conductor, and either the implosion sleeve or dead-end sleeve, as the case may be.

Figure 13:
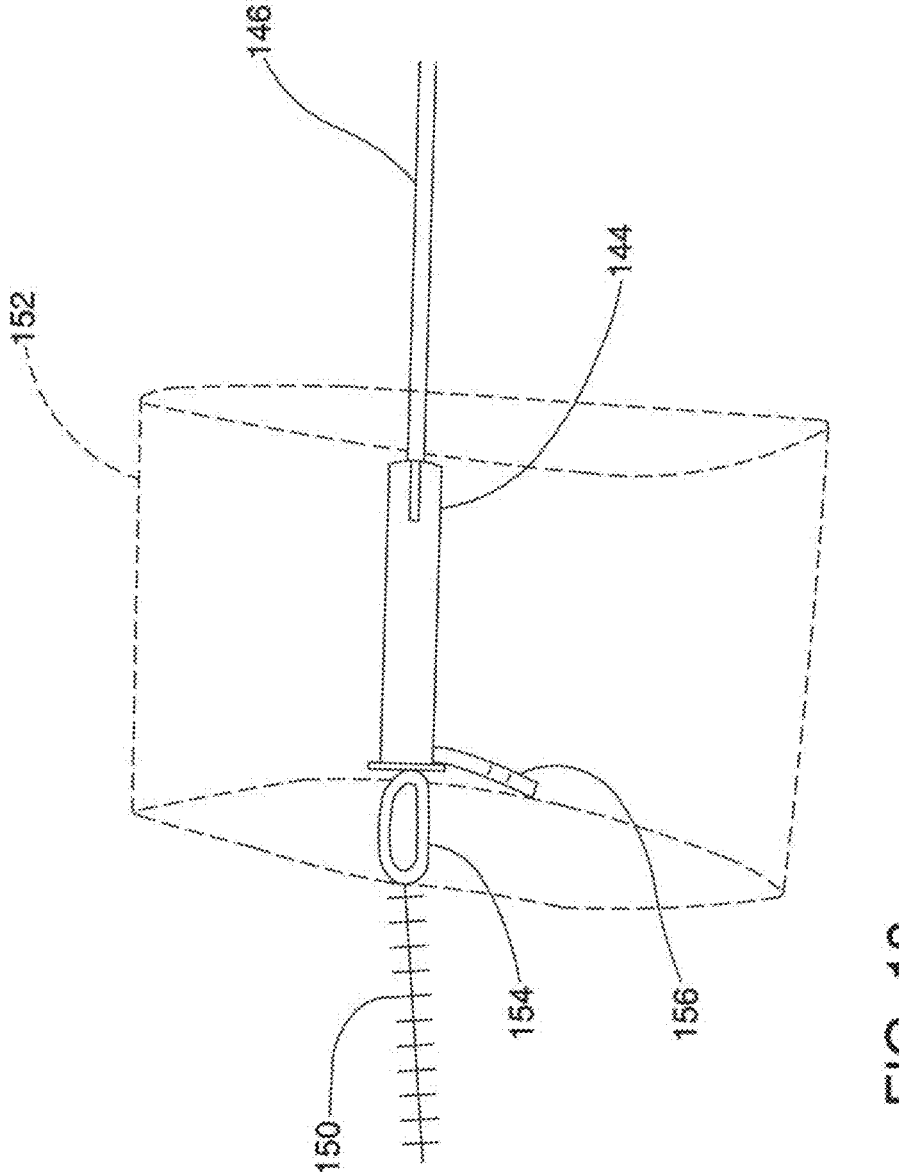
FIG. 13 is an enlarged view of the implosion dead-end sleeve with an implosion shield terminating an electrical conductor to a dead-end structure depicted in FIG. 12.

FIG. 13 is an enlarged view of a portion of FIG. 12 showing the implosion dead-end sleeve 144 terminating an electrical conductor 146 and electrical insulator or insulators 150, which is mechanically connected to dead-end support structure 148. More specifically, implosion dead-end sleeve 144 may be equipped with an eye 154 to facilitate a mechanical connection between implosion dead-end sleeve 144 and electrical insulator or insulators 150. Implosion dead-end sleeve 144 may also be equipped with a connector pad 156, which may facilitate electrical connection to an electrical jumper to transfer electricity to another electrical conductor (not shown). FIG. 13 depicts how implosion cover 152 may be folded over implosion dead-end sleeve 144 to prevent debris from implosion of implosion dead-end sleeve 144 from escaping outside of implosion cover 152 and striking anything. Implosion cover 152 may also attenuate noise or sound during imploding of implosion dead-end sleeve 144. In addition to being folded over and/or around implosion dead-end sleeve 144, because implosion cover 152 is flexible and pliable it may be wrapped completely around implosion dead-end sleeve 144 in the same or similar manner as depicted in FIG. 6.

FIG. 14 depicts an energized electrical conductor 158 into which an implosion sleeve 160 has been installed to do an implosion splice between two conductor ends placed into the opposite ends of implosion sleeve 160. An implosion cover 162 is mounted around implosion sleeve 160, in this case suspended from tension sling or cable 172 by shackles or the like. Implosion cover 162 may be folded over implosion sleeve 160, or wrapped around implosion sleeve 160, but in this case is hung downwardly so that the conductor ends and the implosion sleeve 160 are positioned in the envelope of the implosion cover.

Also used during an energized installation of implosion sleeve 160 is a bypass circuit or jumper 164, shown in FIG. 14, also known as a bypass jumper, that is connected to energized electrical conductor 158 using connector 166 and connector 168. To establish slack in energized electrical conductor 158 to permit a non-tension installation of implosion sleeve 160 in energized electrical conductor 158, a hoist 170 is used to impart tension in a temporary tension sling or cable 172 that is connected to energized electrical conductor 158 using conductor grip 174 and conductor grip 176. Temporary tension sling or cable 172 maintains tension in energized electrical conductor 158 during installation of implosion sleeve 160. Similar to depictions in FIGS. 10 and 11, implosion cover 162 may be held in place or otherwise supported with a frame that surrounds implosion sleeve 160 to prevent debris from striking conductor grips/clamps 174, 176, hoist 170 and any slings 172, which are used during installation of implosion sleeve 160, or similarly, installation of a dead-end implosion sleeve 144 as depicted in FIGS. 12 and 13.

The teachings of the present disclosure may be employed on non-energized power lines or energized power lines. Energized power lines have electricity flowing through them. Thus, efficiencies may be increased while joining conductor 22 and conductor 24 when compared to splicing in a non-energized state insofar as at least the process of de-energizing conductor 22 and, or conductor 24 may not have to be undertaken to splice or join, together conductor 22 and conductor 24. If an implosion cover is utilized in an electrically energized environment that employs an electrically conductive frame, such as a metal frame, such as in the case of the structures depicted and explained in connection with FIGS. 10 and 11, then during an implosion of implosion sleeve 26, metal frame parts will be at the same voltage as conductor 22 and conductor 24, and may be bonded-on to the live conductors to achieve such.

Figure 15:
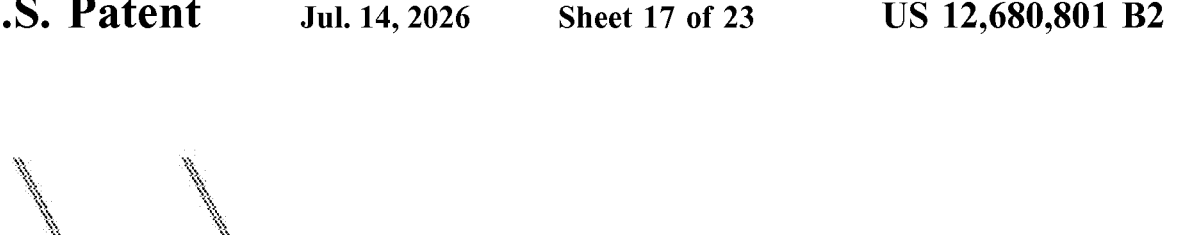
FIG. 15 is a perspective view of a dead-end implosion sleeve at a dead-end structure showing the use of wrapped implosion shields and envelope implosion shields to protect insulators, rigging, hardware, etc. from the detonation of the exposed dead-end implosion sleeve.
Figure 15A:
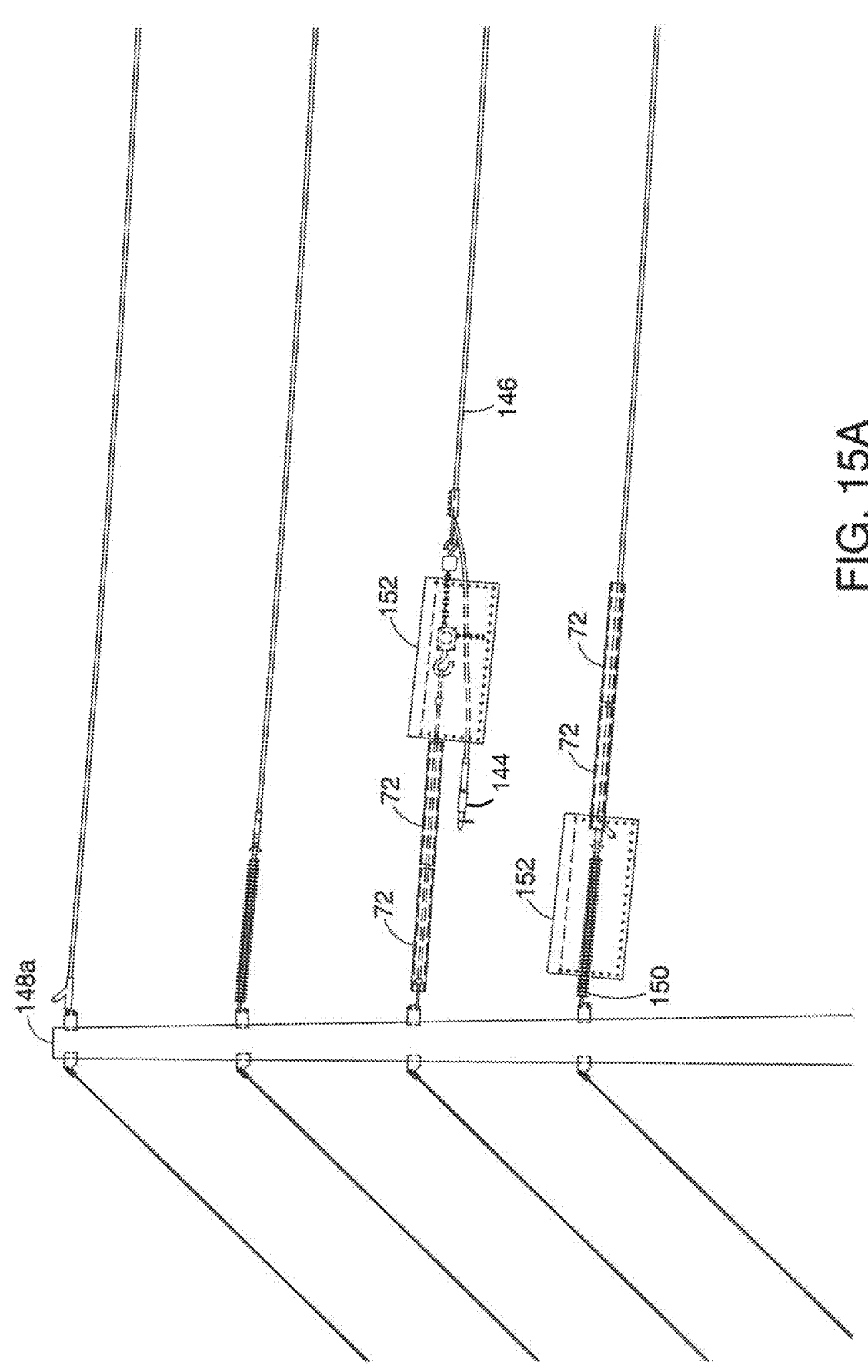
FIG. 15A is a side elevation view of the dead-end structure of FIG. 15 showing the protected rigging, hardware and insulators in better detail.

FIG. 15 is a perspective view of an exposed dead-end implosion sleeve 144 on the end of conductor 146 at a dead-end 148a showing the use of wrapped implosion shields 72 and envelope implosion shields 152 to protect insulator or insulators 150, rigging, hardware, etc., better seen in FIG. 15A, from the detonation of the exposed dead-end implosion sleeve 144.

Figure 16:
FIG. 16 is a perspective view of the implosion splice arrangement of FIG. 14 showing the use of wrapped implosion shields to protect the rigging from the exposed implosion sleeve being used to create the implosion splice.
Figure 16A:
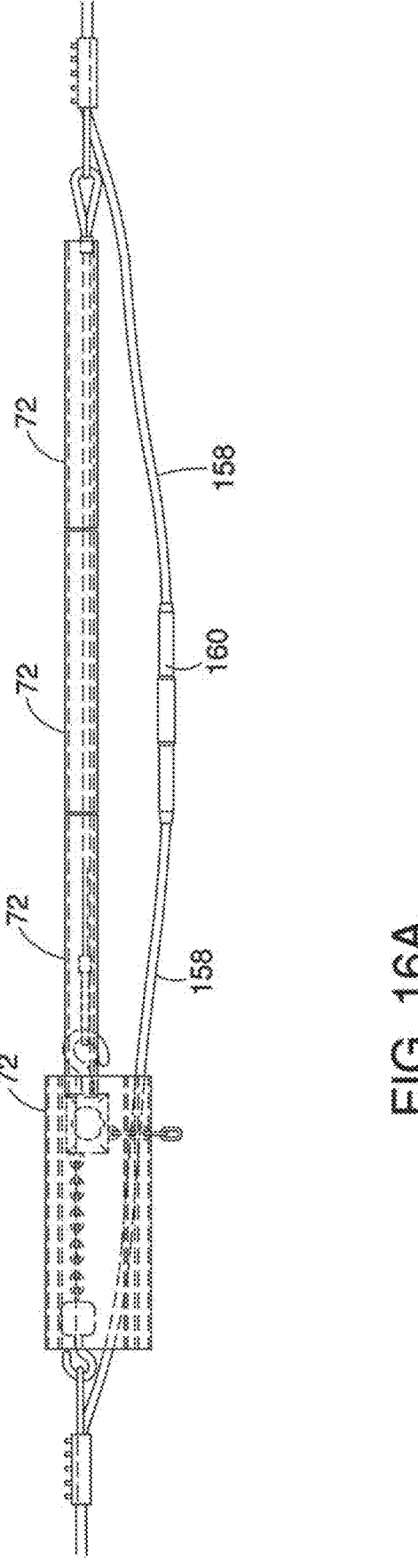
FIG. 16a is a side elevation view of FIG. 16 showing the protected rigging in better detail.

FIG. 16 is a perspective view of the implosion splice arrangement of FIG. 14 showing the use of wrapped implosion shields 72 to protect the rigging, better seen in FIG. 16A, from the exposed implosion sleeve 160 being used to create the implosion splice joining conductor ends 158. Wrapped implosion shields 72 may, as illustrated, be used to wrap around both larger and smaller objects to be protected.

Figures 17, 17A:
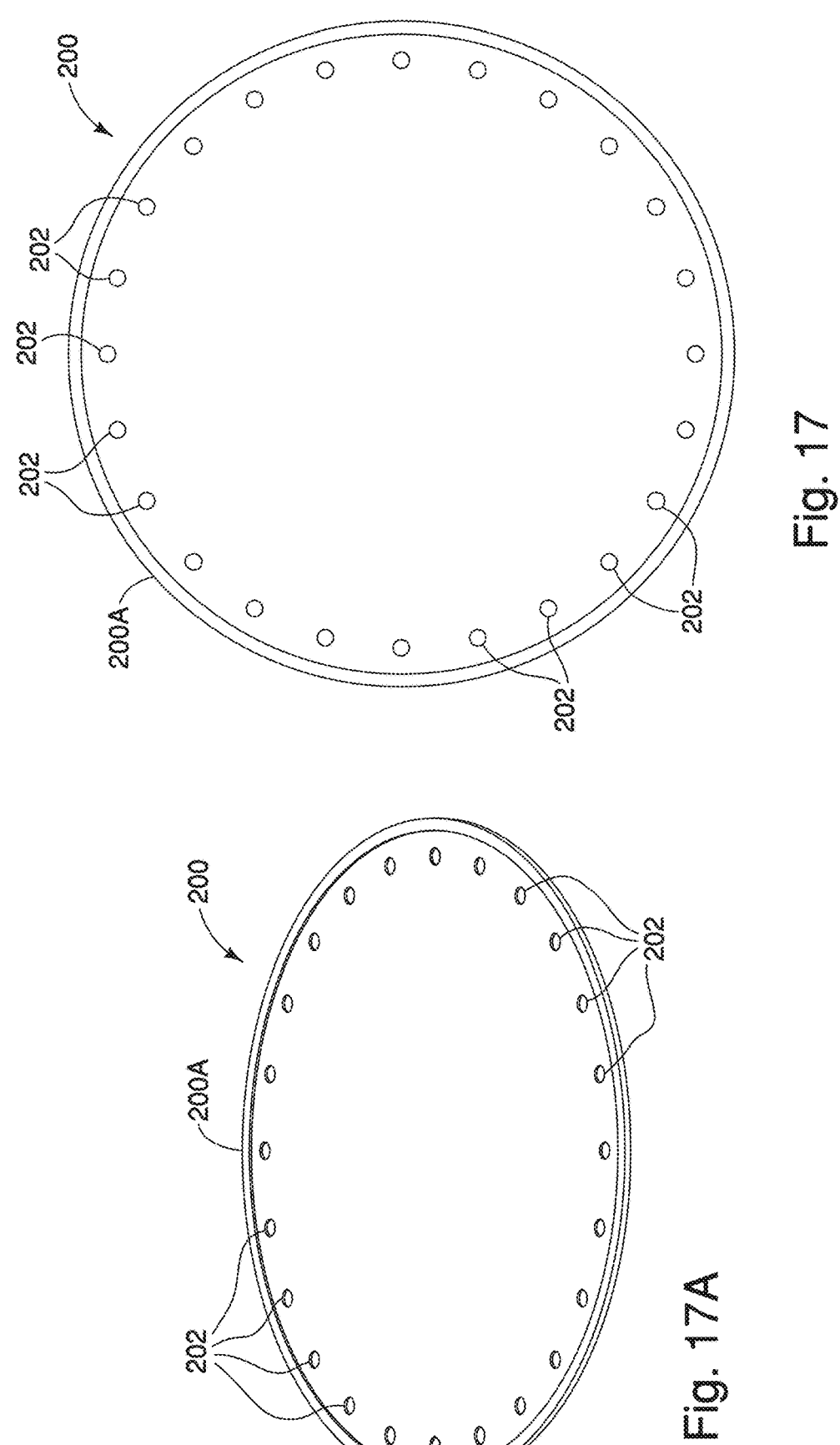
FIG. 17 is, in plan view, a circular embodiment of an implosion shield when laid flat.
FIG. 17A is, in perspective view, the implosion shield of FIG. 17.

FIGS. 17 and 17A are views of a single or multi-layer circular sheet of ballistic fabric 200 when laid flat. FIGS. 5 through 7 and 16, described above, refer to sheets of ballistic fabric 64, 66 (FIG. 5) and 72 (FIGS. 6, 7 and 16). The ballistic sheets are illustrated by way of example as being square or rectangular. In FIG. 5 fasteners 68 are arrayed around the circumference of each ballistic sheet and extend through corresponding holes so as to fasten the top sheet 64 to bottom sheet 66. The ballistic fabric implosion shield 72 is described above as being secured by fasteners such as described in FIG. 3 for fasteners 40, including stitching using plastic, nylon, or other natural or synthetic including aramid materials, such as sold commercially under the trademarks Kevlar and Spectra. Those fasteners may also include such as described above for fasteners 54 shown in FIGS. 4 and 68 shown in FIG. 5. Ballistic fabric implosion shield 72 thus includes holes for the various types of fasteners which, as the fabric sheet is wrapped around the implosion sleeve to coil the desired number of layers of ballistic fabric the holes are aligned once the desired coiling is done to provide for fastening of the coiled layers to one another.

Figure 18:
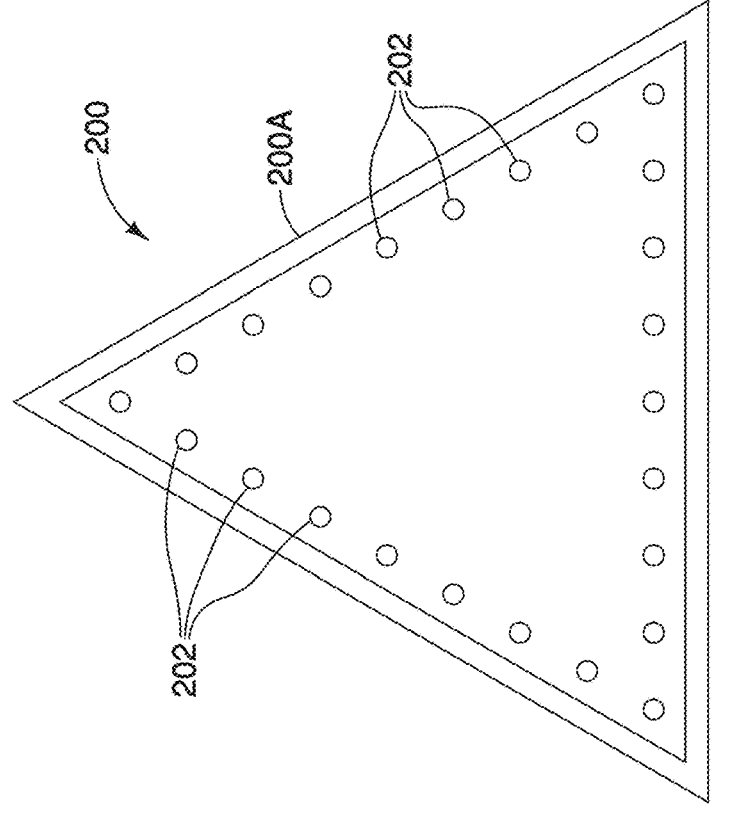
FIG. 18 is, in plan view, a triangular embodiment of an implosion shield when laid flat.
Figure 18A:
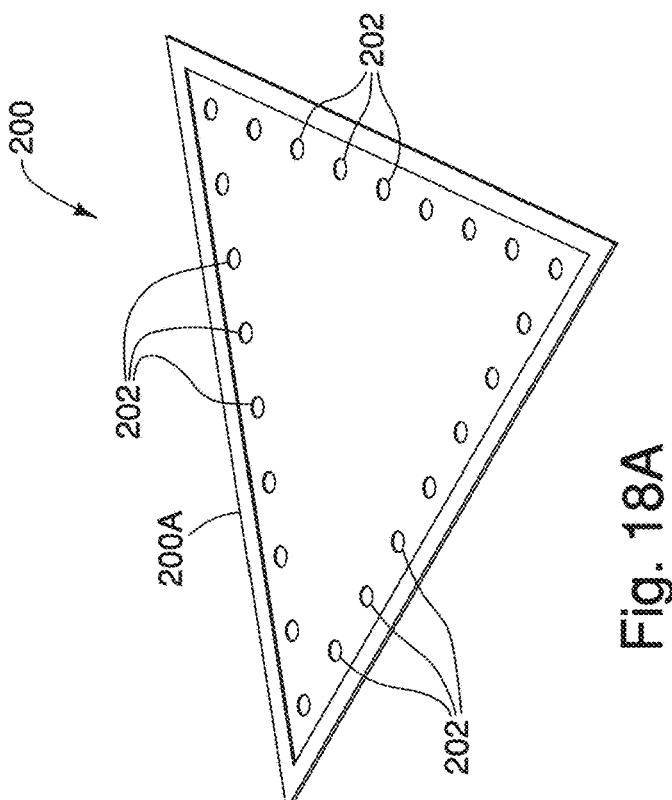
FIG. 18A is, in perspective view, the implosion shield of FIG. 18.
Figures 19, 19A:
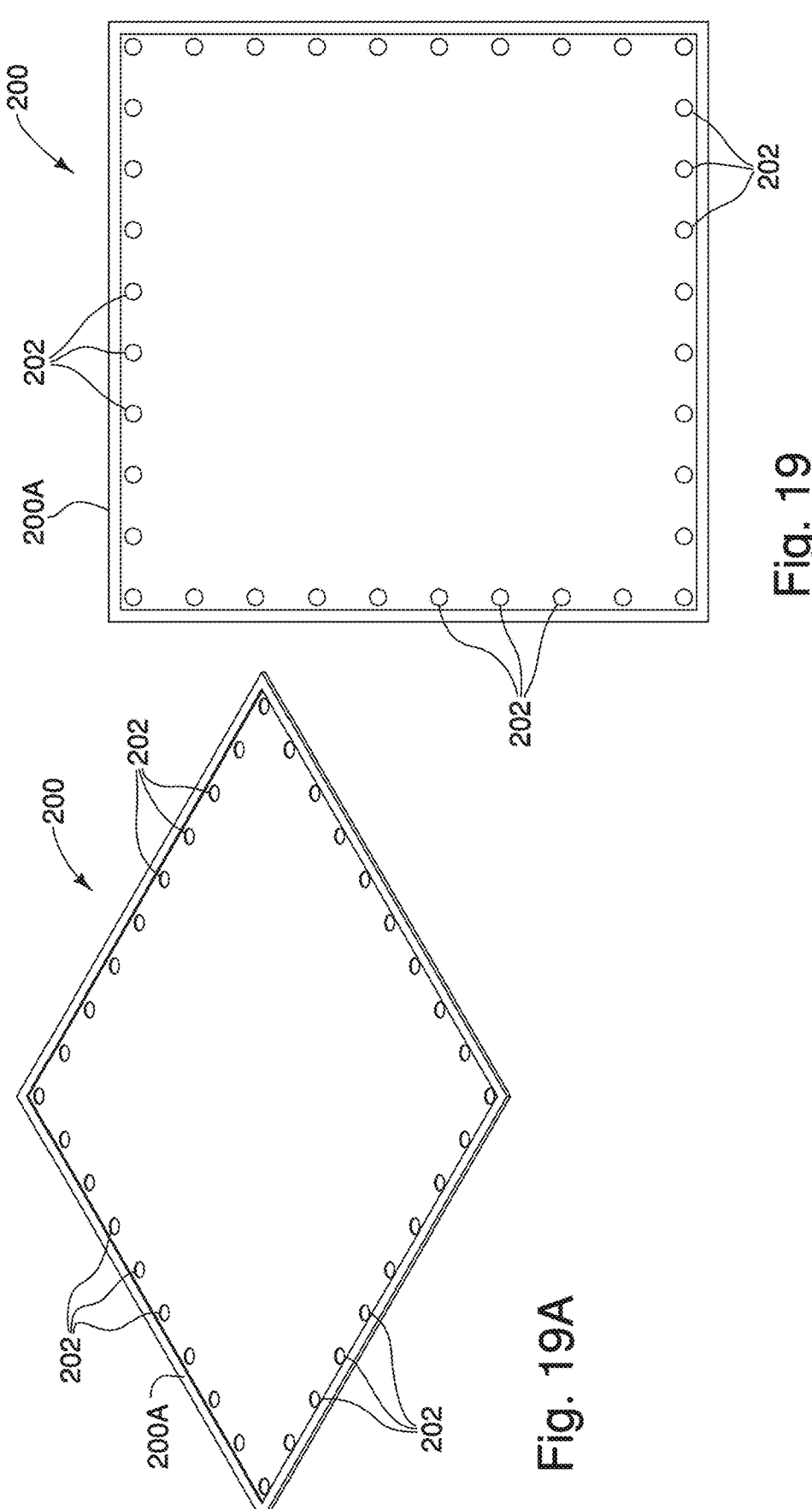
FIG. 19 is, in plan view, a quadrilateral embodiment of an implosion shield when laid flat.
FIG. 19A is, in perspective view, the implosion shield of FIG. 19.

The plan view shape of the sheet, or sheets if multi-layer, of ballistic fabric 200 seen in FIGS. 17 and 17A is an example of a circular shape. Other shapes may include, by way of example, triangular such as seen in FIGS. 18 and 18A, and quadrilaterals such as the square seen in FIGS. 19 and 19A. Other planform shapes are intended to be included within the scope of the present description so long as they may be used as would be known to one skilled in the art in the embodiments illustrated and described. For example so long as they may be adapted for use in the folded, draped or envelope embodiments where one or more free edges are fastened to one another to form the cavity containing the implosion sleeve, or in the wrapped embodiment where the ballistic sheet is coiled around the implosion sleeve, or in the tent embodiment where the ballistic sheet is held be a tent shaped frame spaced apart from and over the implosion sleeve.

As shown in FIGS. 17, 17A, 18, 18A, 19, and 19A, no matter what the planform shape, so long as the ballistic sheets may be adapted to be used in the embodiments disclosed herein and their equivalents, each ballistic fabric sheet 200 has circumferential holes 202 formed around their circumferential perimeter 200A. Not intending to be limiting, preferably holes 202 may be in evenly spaced apart array, for example approximately equally spaced apart by between two to six centimeters, or approximately between one to three inches, all the way around perimeter 200A. In preferred embodiments, holes 202 are approximately equally spaced inset from perimeter 200A, for example by one to two centimeters or approximately by ½ to one inch. Equal spacing both between adjacent holes 202 and equal inset spacing of holes 202 from the perimeter 200A is intended to assist in aligning holes once the ballistic sheet 200 has been folded, wrapped or coiled; for example, so as to allow for ease of fastening the folded, wrapped or coiled sheet 200 to itself to secure the sheet 200 around the implosion sleeve or dead-end. Sheets 200 having holes 202 may then be used in most if not all of the embodiments illustrated or described herein as would be known to one skilled in the art, again where the fasteners may be such as described above in relation to fasteners 40, 54 and 68.

In closing, it should be noted that the discussion of any reference is not an admission that it is prior art to the present disclosure, especially any reference that may have a publication date after the priority date of this application. At the same time, each and every claim below is hereby incorporated into this detailed description or specification as an additional embodiment(s) of the present disclosure.

Although the systems and processes described herein have been described in detail, it should be understood that various changes, substitutions, and alterations can be made without departing from the spirit and scope of the disclosure as defined by the following claims. Those skilled in the art may be able to study the preferred embodiments and identify other ways to practice the disclosure that are not exactly as described herein. It is the intent of the inventors that variations and equivalents of the disclosure are within the scope of the claims while the description, abstract and drawings are not to be used to limit the scope of the disclosure. The disclosure is specifically intended to be as broad as the claims below and their equivalents.

The invention claimed is:

1. An implosion shield for mounting over an implosion sleeve or dead-end having at least horizontally exposed sides, the implosion shield comprising:
    at least one sheet of ballistic fabric adapted to be mounted over, coiled around to form a selected plurality of coiled layers, and fastened so as to surround at least the horizontally exposed sides of, and so as to be secured to, the implosion sleeve or dead-end prior to and during detonation of the implosion sleeve or dead-end with the selected plurality of layers of the coiled at least one sheet of ballistic fabric coiled therearound, and wherein the fastening is of one layer of the coiled at least one sheet of ballistic fabric to at least an adjacent layer of the coiled at least one sheet of ballistic fabric when so mounted on the implosion sleeve or dead-end.

2. The apparatus according to claim 1, wherein the at least one sheet of ballistic fabric includes holes through each sheet of the at least one sheet of ballistic fabric, and wherein the holes are positioned around a perimeter of each said sheet of ballistic fabric, and wherein the holes are adapted to accept corresponding fasteners therethrough.

3. The apparatus according to claim 2, wherein the holes form an evenly spaced apart array of holes around the perimeter.

4. The apparatus according to claim 3 wherein the holes are inset by an inset distance from the perimeter, and wherein the inset distance from the perimeter is equal along the length of the array of holes.

5. The apparatus of claim 4, wherein the inset distance is in the range of substantially ½ inch to one inch.

6. The apparatus according to claim 3 wherein the spacing between the holes in the array is in the range of substantially one to three inches.

7. The apparatus according to claim 6 wherein the coiled at least one sheet of ballistic fabric has opposite open ends, wherein a size of the opening at each of the opposite open ends is regulated by how tightly the coiled at least one sheet of ballistic fabric is coiled so as to define a gas escape through-way for pressurized gas from the detonation of the implosion sleeve to exit the openings.

8. The apparatus according to claim 2, wherein each sheet of the at least one sheet of ballistic fabric has a shape in planform chosen from the group comprising: circular, quadrilateral, triangular.

9. The apparatus according to claim 2 wherein the at least one sheet of ballistic fabric is a single sheet of ballistic fabric.

10. The apparatus of claim 2 wherein the fasteners that the holes are adapted to accept are flexible fasteners to reduce fragmentation causing shrapnel during the detonation.

11. The apparatus of claim 2 wherein the at least one sheet of ballistic fabric is coiled so as to form a cylindrical ballistic shield, and wherein the holes are positioned so that the holes are aligned in the cylindrical ballistic shield for the securing of the fasteners through the holes in adjacent said layers to retain the cylindrical ballistic shield mounted on and around the implosion sleeve or dead-end until the detonation of the implosion shield or dead-end.

12. The apparatus of claim 1 wherein the at least one sheet of ballistic fabric is formed as a cylinder to provide a ballistic shield.

13. The apparatus of claim 1 wherein the at least one sheet of ballistic fabric is formed as an envelope or supported on a frame as a tent to provide a ballistic shield.

14. A method of using the implosion shield of claim 1 when the implosion sleeve or dead-end has been installed on a power line, the method comprising:
    selecting the number of layers in the plurality of layers of the at least one sheet of ballistic fabric to be coiled onto the implosion sleeve or dead-end,
    selecting the size of the at least one sheet of ballistic fabric to accomplish the selected number of layers of the plurality of layers once wrapped onto the implosion sleeve or dead-end, and
    installing the implosion shield by coiling the selected number of layers of the plurality of layers over and around the installed implosion sleeve or dead-end so as to cover at least the exposed horizontal sides of the implosion sleeve or dead-end with the selected number of the plurality of layers of the at least one sheet of ballistic fabric.

15. The method of claim 14 wherein the at least one sheet of ballistic fabric includes holes through and around a perimeter of each sheet of the at least one sheet of ballistic fabric, and wherein as a cylindrical ballistic shield is formed during the installation step into a final cylindrical form a number of the holes in one layer of the coiled at least one sheet of ballistic fabric are aligned with an adjacent number of the holes in an adjacent layer of the coiled at least one sheet of ballistic fabric to accept corresponding fasteners therethrough, and wherein the method further comprises fastening the adjacent layers together using the fasteners in the corresponding holes of the aligned number of holes.

16. The method of claim 15, wherein the holes form an evenly spaced apart array of holes around the perimeter.

17. The method of claim 15 further comprising forming the implosion shield from auxetic ballistic fabric.

18. The method of claim 14, further comprising forming the implosion shield with sufficient numbers of the layers coiled around the implosion sleeve so as to attenuate shock, pressure and sound waves emanating from detonation of the implosion sleeve or dead-end and so as to direct the pressurized gas emanating from the detonation from the open ends at each opposite end of the coiled layers of the at least one sheet of ballistic fabric.

19. The method of claim 18 wherein the number of coiled layers is between substantially two to four coiled layers.

20. The method of claim 18, wherein the sufficient number of layers coiled around the implosion sleeve direct a shock wave from the detonation of the implosion sleeve or dead-end parallel to the power line.

\* \* \* \* \*